(12) United States Patent
Kim et al.

(10) Patent No.: US 12,432,754 B2
(45) Date of Patent: Sep. 30, 2025

(54) MULTICAST-RELATED COMMUNICATION

(71) Applicant: LG Electronics Inc., Seoul (KR)

(72) Inventors: Laeyoung Kim, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 364 days.

(21) Appl. No.: 18/030,866

(22) PCT Filed: Jul. 26, 2021

(86) PCT No.: PCT/KR2021/009668
§ 371 (c)(1),
(2) Date: Apr. 7, 2023

(87) PCT Pub. No.: WO2022/075562
PCT Pub. Date: Apr. 14, 2022

(65) Prior Publication Data
US 2023/0379942 A1 Nov. 23, 2023

(30) Foreign Application Priority Data

Oct. 7, 2020 (KR) .......... 10-2020-0129639
Nov. 2, 2020 (KR) .......... 10-2020-0144504
Dec. 31, 2020 (KR) .......... 10-2020-0189487

(51) Int. Cl.
*H04W 4/00* (2018.01)
*H04W 36/00* (2009.01)
(Continued)

(52) U.S. Cl.
CPC ..... *H04W 72/30* (2023.01); *H04W 36/00695* (2023.05); *H04W 36/00698* (2023.05); *H04W 36/1443* (2023.05)

(58) Field of Classification Search
CPC .......... H04W 72/30; H04W 36/00695; H04W 36/00698; H04W 36/1443; H04W 76/22;
(Continued)

(56) References Cited

U.S. PATENT DOCUMENTS

2010/0150049 A1   6/2010   Kim et al.
2020/0305118 A1   9/2020   Ryu et al.
(Continued)

FOREIGN PATENT DOCUMENTS

KR   10-2020-0030555   3/2020
WO   WO 2020/145523   7/2020

OTHER PUBLICATIONS

Huawei et al., "KI#1: Update of Sol. 3: resolving open issue(s) for UE leaves MBS," 3GPP TSG-WG SA2 Meeting #140E e-meeting, S2-2006298, Elbonia, Aug. 19-Sep. 1, 2020, 7 pages.
(Continued)

*Primary Examiner* — Omoniyi Obayanju
(74) *Attorney, Agent, or Firm* — Fish & Richardson P.C.

(57) ABSTRACT

Provided in one embodiment of the present specification is a method by which an NG-RAN node performs communication related to a multicast. The method may comprise the steps of: receiving, from an AMF, a UE context release command message related to a first UE; determining that the first UE moves from a 5GS to an EPS, on the basis of the reception of the UE context release command message; and removing, from a context related to a multicast session, information related to the first UE.

12 Claims, 13 Drawing Sheets

(51) Int. Cl.
  *H04W 36/14* (2009.01)
  *H04W 72/30* (2023.01)
(58) Field of Classification Search
  CPC ........... H04W 36/00222; H04W 76/34; H04W 36/0007
  See application file for complete search history.

(56) References Cited

U.S. PATENT DOCUMENTS

2021/0234717 A1\* 7/2021 Speicher ........... H04W 36/0016
2023/0018958 A1\* 1/2023 Gan .................... H04W 36/302

OTHER PUBLICATIONS

International Search Report and Written Opinion in International Appln. No. PCT/KR2021/009668, mailed on Oct. 28, 2021, 6 pages(with English translation).
Qualcomm Incorporated, "Solution to KI#9: Switching to unicast transport for mobility to E-UTRAN/EPC." SA WG2 Meeting #140E, S2-2005776, E-Meeting, Aug. 19-Sep. 1, 2020, 5 pages.
3GPP TR 23.757 V0.5.0 (Sep. 2020), 3rd Generation Partnership Project; Technical Specification Group Services and System Aspects; Study on architectural enhancements for 5G multicast-broadcast services (Release 17), Sep. 2020, 231 pages.
3GPP TS 23.502 V16.5.0 (Jul. 2020), 3rd Generation Partnership Project; Technical Specification Group Services and System Aspects; Procedures for the 5G System (5GS); Stage 2 (Release 16), Jul. 2020, 594 pages.
Ericsson, "KI#7, Update to Sol#11 & 12," S2-2006320, SA WG2, Meeting #140E, Electronic meeting, Aug. 19-Sep. 1, 2020, 10 pages.
Extended European Search Report in European Appln. No. 21877817.3, mailed on Oct. 10, 2024, 15 pages.
Huawei, HiSilicon, "KI#9, Update to solution #43 and conclusion," S2-2100715, 3GPP TSG-WG SA2, Meeting #143E, e-meeting, Elbonia, Feb. 24-Mar. 9, 2021, 3 pages.
Nokia Siemens Networks, Nokia, "MME initiated UE Context Release," R3-080165, 3GPP TSG RAN WG3, Meeting #59, Sorrento, Italy, Feb. 11-15, 2008, 3 pages.
Qualcomm Incorporated, LG Electronics, "KI#9: Sol. 43 update to address editor's notes," S2-2009224, 3GPP TSG-SA WG2, #142E, e-meeting, Elbonia, Nov. 16-20, 2020, 3 pages.

\* cited by examiner

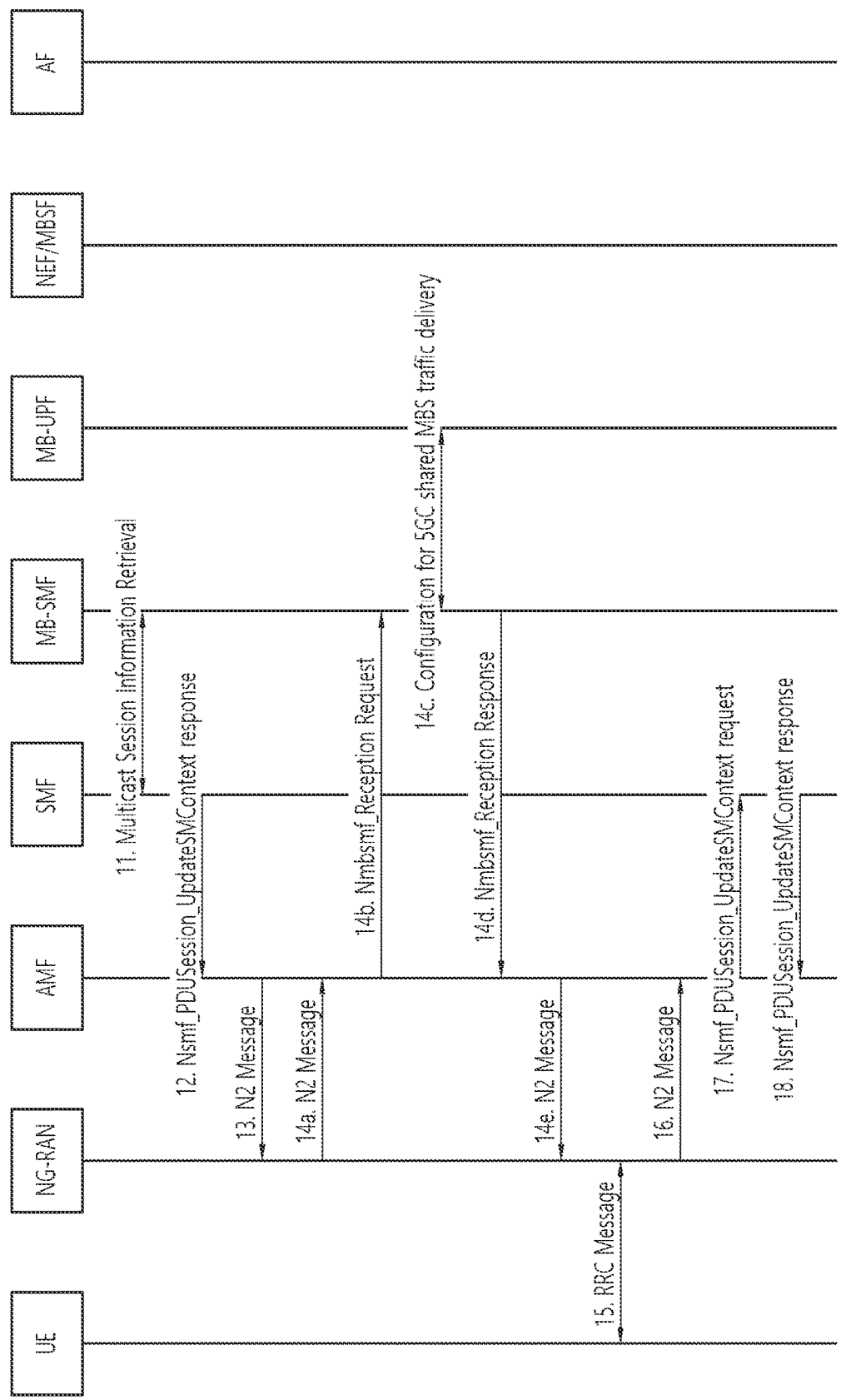

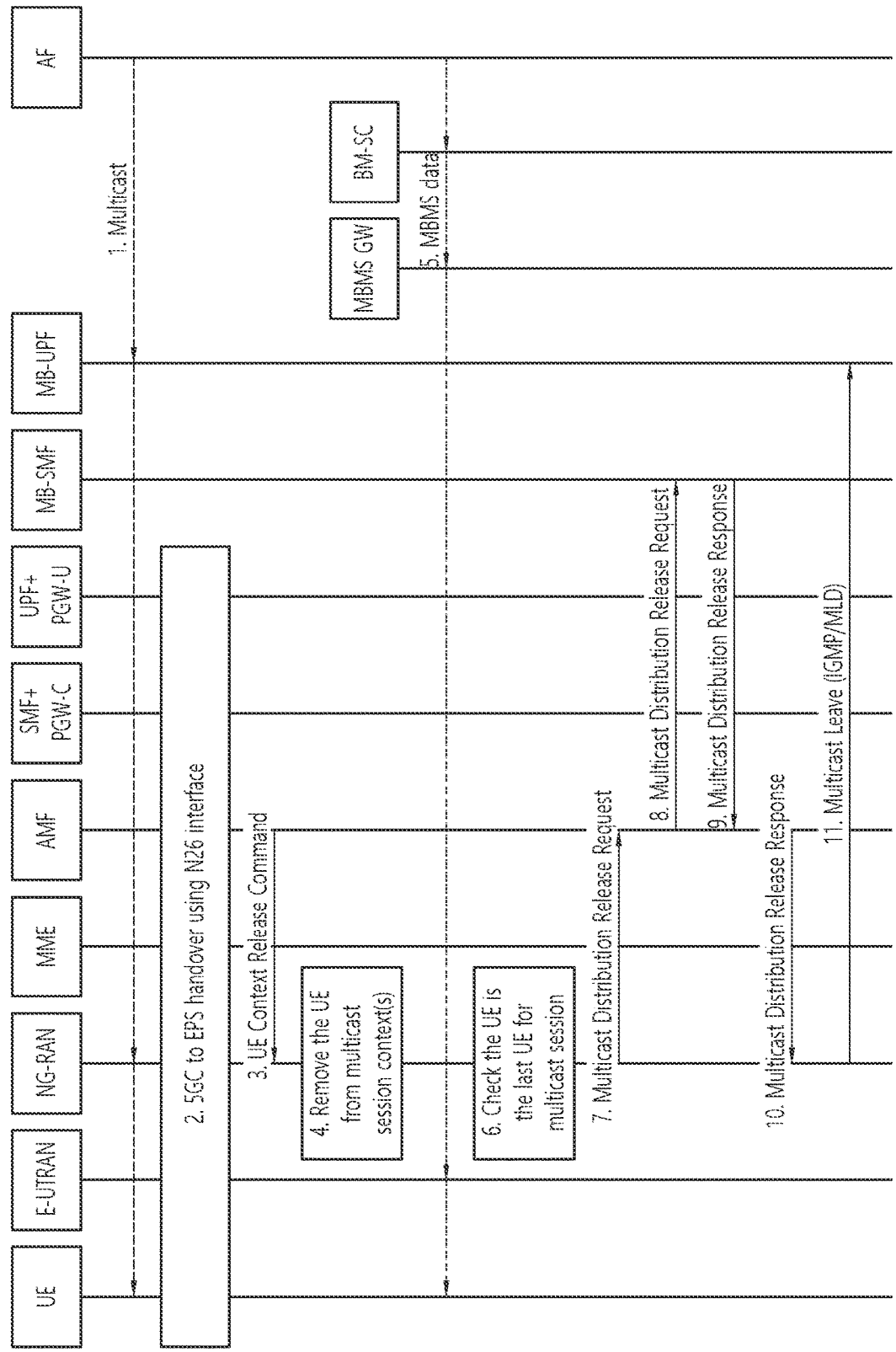

MULTICAST-RELATED COMMUNICATION

CROSS-REFERENCE TO RELATED APPLICATIONS

This application is a National Stage application under 35 U.S.C. § 371 of International Application No. PCT/KR2021/009668, filed on Jul. 26, 2021, which claims the benefit of Korean Patent Application No. 10-2020-0129639, filed on Oct. 7, 2020, Korean Patent Application No. 10-2020-0144504, filed on Nov. 2, 2020, and Korean Patent Application No. 10-2020-0189487, filed on Dec. 31, 2020. The disclosures of the prior applications are incorporated by reference in their entirety.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Meanwhile, in 5G mobile communication, multicast communication (e.g., communication based on Multicast-Broadcast Services (MBS)) has been introduced. A terminal (e.g., user equipment (UE)) and a network may perform multicast communication in a 5GS (5G system) in a multicast manner.

By performing multicast communication in 5GS, a terminal receiving multicast traffic (e.g., MBS traffic) can move to the Evolved Packet System (EPS). Then, the terminal can receive the MBS traffic received in the 5GS through broadcast communication supported by the Multimedia Broadcast & Multicast Service (MBMS) method in the EPS.

On the other hand, according to the prior art, even after a UE moves from 5GS to EPS, 5GS does not remove the existing multicast context (or MBS context) for this UE. As a result, even though the terminal no longer performs multicast communication in 5GS, there is a problem that the 5G core network and base station (e.g., Next Generation Radio Access Network (NG-RAN)) continue to make efforts to provide services related to multicast communication to terminals.

For example, the base station has a problem of performing unnecessary operations such as continuously receiving multicast traffic for the UE from the User Plane Function (UPF) even though the UE has left the 5GS.

SUMMARY

Accordingly, a disclosure of the present specification has been made in an effort to solve the aforementioned problem.

In order to solve the above problems, one disclosure of the present specification provides a method for performing communication related to multicast by an NG-RAN node. The method may include receiving a UE context release command message related to a first UE from an AMF; determining that the first UE moves from 5GS to EPS based on the UE context release command message being received; and removing information related to the first UE from a context related to the multicast session.

In order to solve the above problems, one disclosure of the present specification provides an NG-RAN node performing communication related to multicast. An NG-RAN node includes at least one processor; and at least one memory that stores instructions and is operatively electrically connectable with the at least one processor, wherein operations performed based on execution of the instructions by the at least one processor include: receiving a UE context release command message related to a first UE from an AMF; determining that the first UE moves from 5GS to EPS based on the UE context release command message being received; and removing information related to the first UE from a context related to the multicast session.

In order to solve the above problems, one disclosure of the present specification provides a method for AMF to perform communication related to multicast. The method includes, based on the first UE moving from 5GS to EPS, transmitting a UE context release command message related to the first UE to an NG-RAN node serving the first UE; and receiving a multicast distribution release request message from the NG-RAN node.

In order to solve the above problems, one disclosure of the present specification provides an AMF that performs communication related to multicast. The AMF includes at least one processor; and at least one memory that stores instructions and is operatively electrically connectable with the at least one processor, wherein operations performed based on execution of the instructions by the at least one processor include: based on the first UE moving from 5GS to EPS, transmitting a UE context release command message related to the first UE to an NG-RAN node serving the first UE; and receiving a multicast distribution release request message from the NG-RAN node.

According to the disclosure of the present specification, it is possible to solve the problems of the related art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIGS. 8A and 8B show an example of a procedure for generating a multicast session.

FIG. 10 shows an example of a signal flow diagram according to a third example of the disclosure of the present specification.

DETAILED DESCRIPTION

Figure 1:
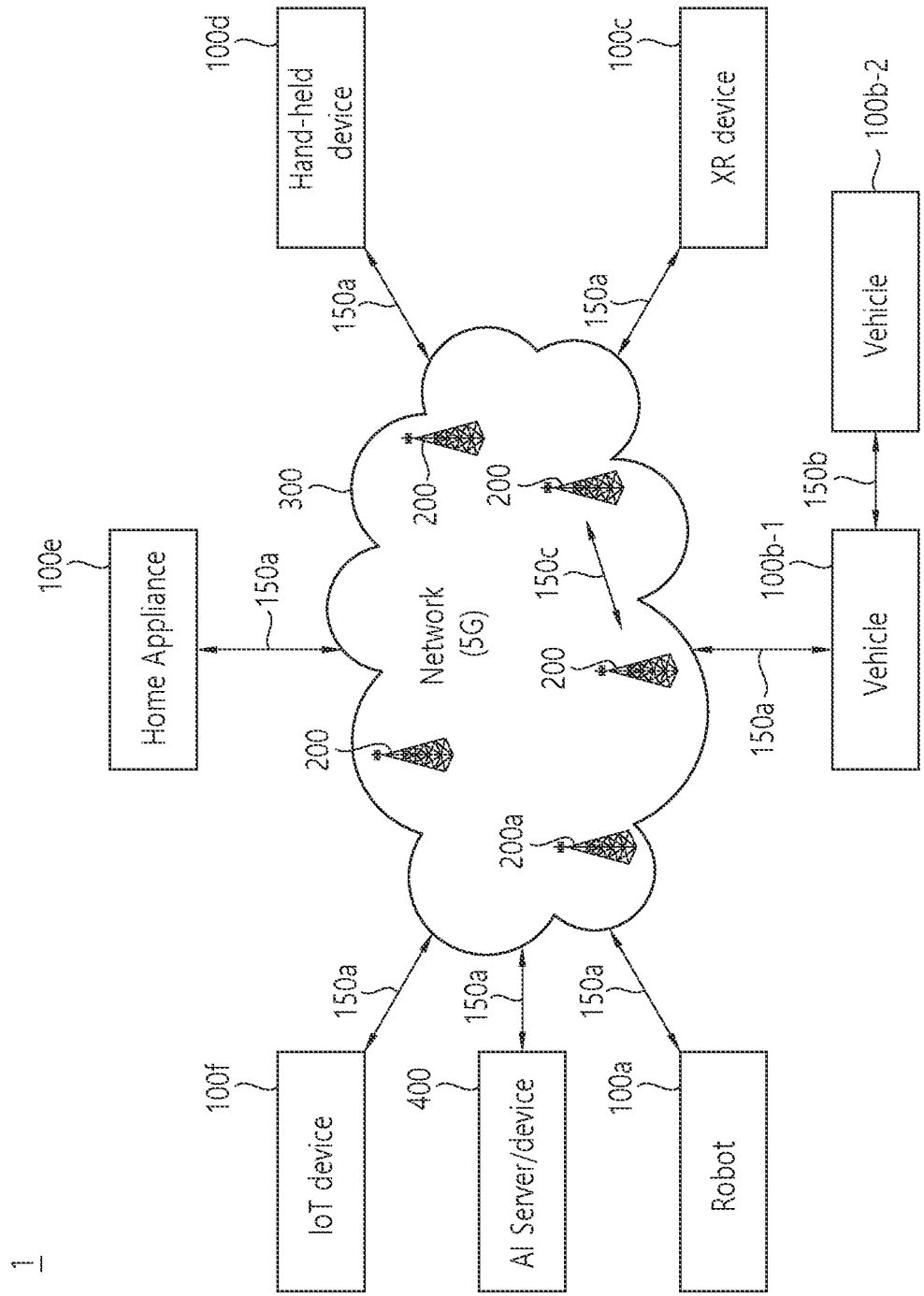
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example. "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A. B or C" or "at least one of A. B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the attached drawings, user equipments (UEs) are shown for example. The UE may also be denoted a terminal or mobile equipment (ME). In addition, the UE may be a laptop computer, a mobile phone, a PDA, a smartphone, a multimedia device, or other portable device, or may be a stationary device such as a PC or a car mounted device.

Hereinafter, the UE is used as an example of a wireless communication device (or a wireless apparatus, or a wireless device) capable of wireless communication. An operation performed by the UE may be performed by a wireless communication device. A wireless communication device may also be referred to as a wireless apparatus, a wireless device, or the like. Hereinafter, AMF may mean an AMF node, SMF may mean an SMF node, and UPF may mean a UPF node.

The term "base station" used hereinafter generally refers to a fixed station that communicates with a wireless device and may be denoted by other terms such as evolved-NodeB (eNodeB), evolved-NodeB (eNB), Base Transceiver System (BTS), access point, or Next generation NodeB (gNB).

I. Techniques and Procedures Applicable to the Disclosure of the Present Specification FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally. and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally, and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
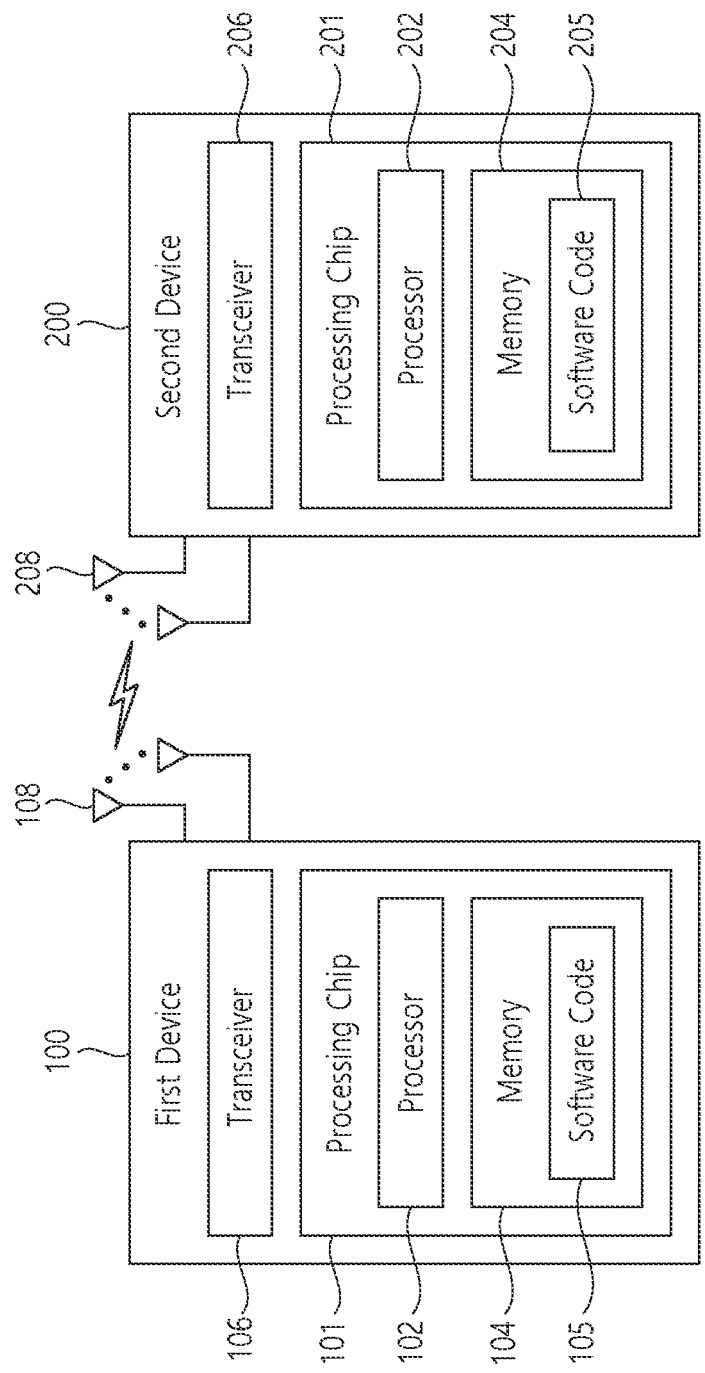
FIG. 2 shows an example of a wireless device to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals)

from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
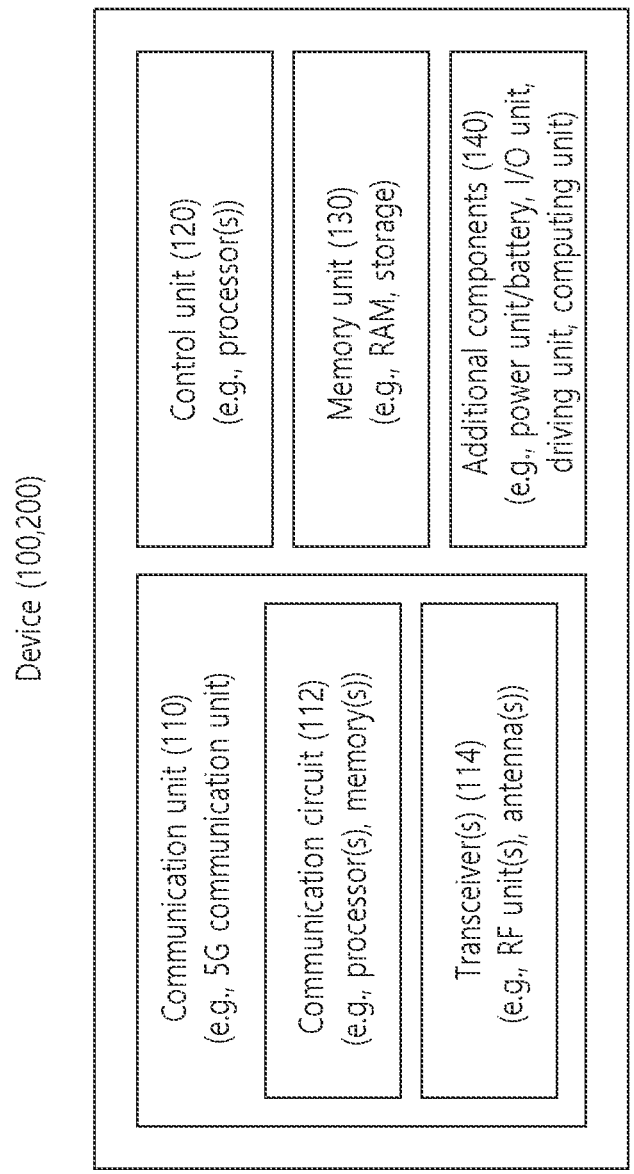
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
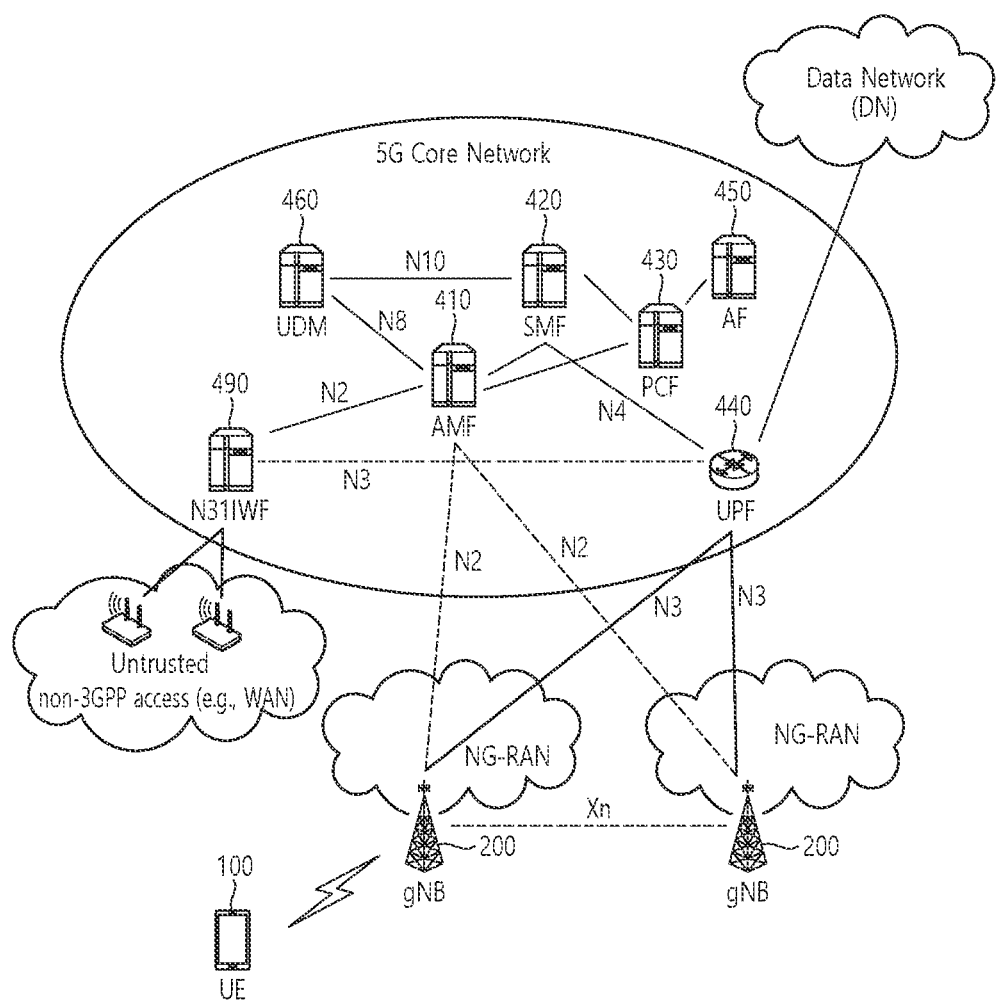
FIG. 4 is a structural diagram of a next-generation mobile communication network.

FIG. 4 is a structural diagram of a next-generation mobile communication network.

5GC(5G Core) may include various components, part of which are shown in FIG. 4, including an access and mobility management function (AMF) 410, a session management function (SMF) 420, a policy control function (PCF) 430, a User Plane Function (UPF) 44, an application function (AF) 450, a unified data management (UDM) data network 460, and a non-3GPP (3rd Generation Partnership Project) interworking function (N3IWF) 490.

A UE 100 is connected to a data network via the UPF 440 through a Next Generation Radio Access Network (NG-RAN) including the gNB 20.

The UE 100 may be provided with a data service even through untrusted non-3GPP access. e.g., a wireless local area network (WLAN). In order to connect the non-3GPP access to a core network, the N3IWF 490 may be deployed.

The illustrated N31WF 490 performs a function of managing interworking between the non-3GPP access and the 5G system. When the UE 100 is connected to non-3GPP access (e.g., WiFi referred to as IEEE 801.11), the UE 100 may be connected to the 5G system through the N31WF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing Non-Access Stratum (NAS) security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 20 and the SMF 420. In addition, when the UE 100 moves over an area served by the gNB 20, the UPF 440 serves as a mobility anchor point. The UPF 440 may perform a function of handling a PDU. For mobility within the NG-RAN (which is defined after 3GPP Release-15), the UPF 440 may route packets. In addition, the UPF 540 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 44 may correspond to a termination point of a data interface toward the data network.

The illustrated PCF 430 is anode that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (100) may be omitted.

The $5^{th}$ generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

Figure 5:
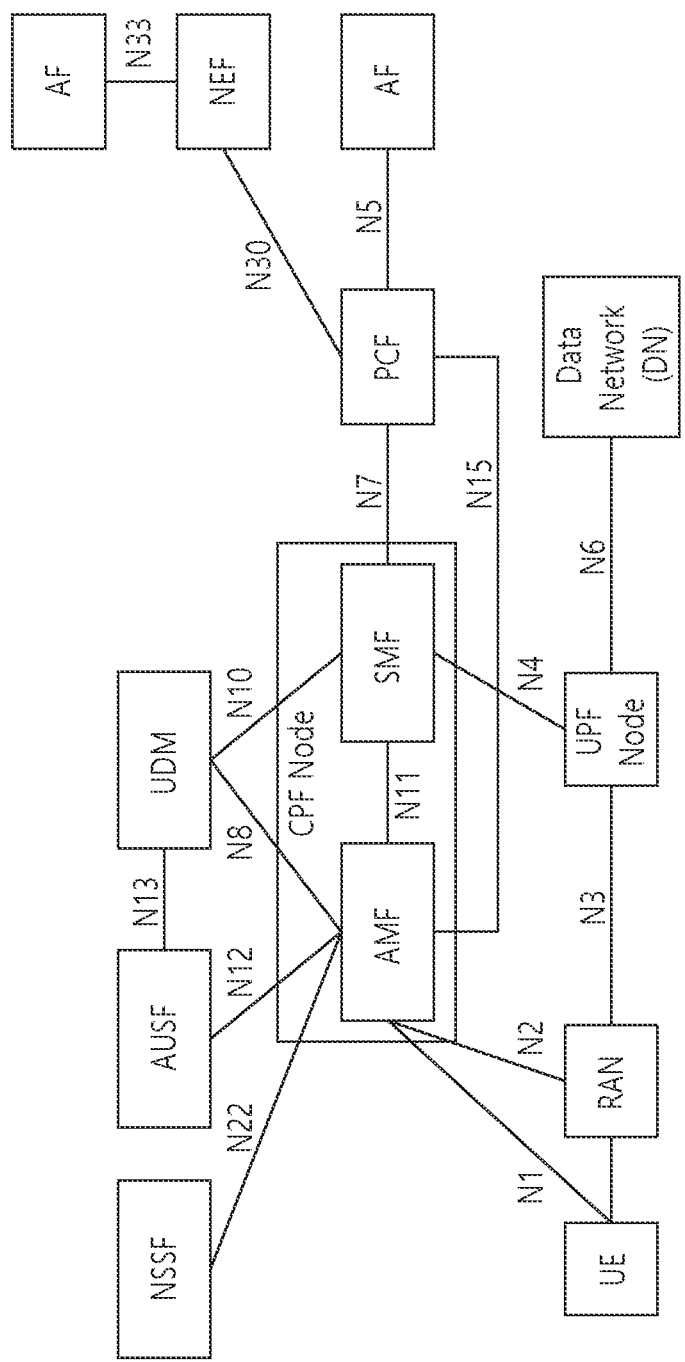
FIG. 5 is an exemplary diagram illustrating a predicted structure of a next generation mobile communication in terms of a node.

FIG. 5 is an exemplary diagram illustrating a predicted structure of a next generation mobile communication in terms of a node.

Referring to FIG. 5, the UE is connected to a data network (DN) through a next generation RAN (Radio Access Network).

The Control Plane Function (CPF) node shown in FIG. 5 may perform all or part of the Mobility Management Entity (MME) function of the fourth-generation mobile communication, and all or a part of the control plane function of the Serving Gateway (S-GW) and the PDN (Packet Data Network)-gateway (P-GW) of the fourth-generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth-generation mobile communication.

The Policy Control Function (PCF) node shown in FIG. 5 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Descriptions of the reference points shown in FIG. 5 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIG. 5, AF by a third party other than an operator may be connected to 5GC through a network exposure function (NEF).

II. Techniques and Procedures Related to the Disclosure of the Present Specification Techniques and procedures related to the disclosure herein are described below. In addition, examples of problems to be solved in the disclosure of the present specification may also be described below.

Hereinafter, examples of problems to be solved in the disclosure of the present specification are described.

A method to support MBS (Multicast-Broadcast Services) in 5GS is being discussed. For example, architectural enhancements for 5G MBS are being discussed. The method of supporting MBS in 5GS is being discussed to achieve the following goals, for example.

The goal of discussing how to support MBS in 5GS may be to identify and evaluate potential enhancements in the 5G system architecture to provide MBS services that can be used for a variety of vertical businesses. An example of the goal of a scheme to support MBS in 5GS is as follows:

To support multicast/broadcast services, a framework including a functional split between (R)AN and CN may be defined. For example, multicast/broadcast services may include ad-hoc multicast/broadcast streams, transparent IPv4/IPv6 multicast delivery, IPTV, software delivery over the air, group communication and broadcast/multicast Internet on Things (IoT) applications, V2X applications, public safety, and more.

May support for different levels of services (e.g., transport only mode vs. full service mode).

Enable flexible (i.e., distributed vs. centralized) network deployment and operation (e.g., CP-UP separation).

Address whether and how relevant QoS and PCC rules are applicable to multicast/broadcast services.

Support use cases and requirements (e.g. service continuity) for public safety.

Among NG-RANs, a method of supporting MBS in 5GS can be discussed centering on radio access technology according to NR. Support for UEs using or moving to access that does not support multicast/broadcast may be considered.

Regarding MBS in 5GS, issues such as the following examples are being discussed. For example, when a transition between NR/5GC and E-UTRAN/EPC is performed, a method for minimizing interruption of public safety services is being discussed.

The specific explanation of this issue is as follows. As previously discussed, in high level MBS architecture, only NR based on NG-RAN (e.g., NG-RAN connected to 5GC) is considered as RAT. That is, a method for supporting MBS through E-UTRA connected to 5GC has not been discussed.

This issue may be applied to Evolved Universal Terrestrial Radio Access Network (E-UTRAN)/Evolved Packet Core (EPC) based evolved Multimedia Broadcast&Multicast Service (eMBMS) deployment/deployment and PLMN with 5G MBS through NR/5GC, with the Public Safety Service.

There may be cases in which a UE receiving a service targeted for multicast delivery through NR/5GC moves to E-UTRAN/EPC and uses eMBMS. Also, the opposite may also be the case. How to handle this service through both EPC and 5GC and how to handle mobility between RATs (RATs) should be considered.

Thus, a solution to this issue focused on public safety services could satisfy:

For UEs camping on E-UTRAN (eMBMS) and UEs connected via NR connected to 5GC (via 5G MBS solution), AF (e.g., Public Safety Group Communication System (GCS) Application Server (AS)) can be allowed to provide the same multicast/broadcast service.

Define procedures for UEs performing inter-CN type mobility between EPC and 5GC during a multicast session.

A goal to address this issue may be to minimize service interruption and packet loss and achieve re-connection as quickly as possible during transitions between the various systems.

Various solutions related to multicast transmission are defined in prior art documents (e.g., 3GPP TR 23.757 v1.0.0). For example, Solution #3: Integrated Multicast and Unicast Transport in Section 6.3, Solution #4: Multicast session management with dedicated MBS network functions in Section 6.4, and Solution #6: Multicast service initiation in Section 6.6 are defined.

However, according to the prior art, multicast transmission for MBS is not supported in EPS. Therefore, when the UE receives MBS traffic in a multicast method in 5GS, when the UE moves from 5GS to EPS, a method for the UE to continue receiving the corresponding MBS traffic in a unicast manner in EPS must be supported.

Multicast transmission for MBS is not supported in EPS. Accordingly, when the UE receives MBS traffic in the multicast method in 5GS, when moving to EPS, the corresponding MBS traffic can be continuously received in a non-multicast method, that is, a broadcast method supported by EPS MBMS. MBS service continuity from 5GS to EPS can be achieved through the service layer.

The transmission of the multicast method can be interpreted as transmitting traffic using a path/tunnel/resource established for a multicast group (assuming that a shared resource is used) rather than traffic transmission through a PDU session established by the UE. In the latter case, shared resources may be used in both the core network section and the radio section, shared resources may be used only in the core network section.

In order to support MBS service continuity from 5GS to EPS using the above service layer, solutions such as the following examples are being discussed. The solution described in the following example will be referred to as "Service layer continuity between E-UTRAN/EPC MBMS and NR/5GC MBS".

First, with reference to the example of FIG. 6, an example of a system architecture for interworking between 5G MBS and E-UTRAN/EPC (e.g., interworking in a service layer) will be described.

Figure 6:
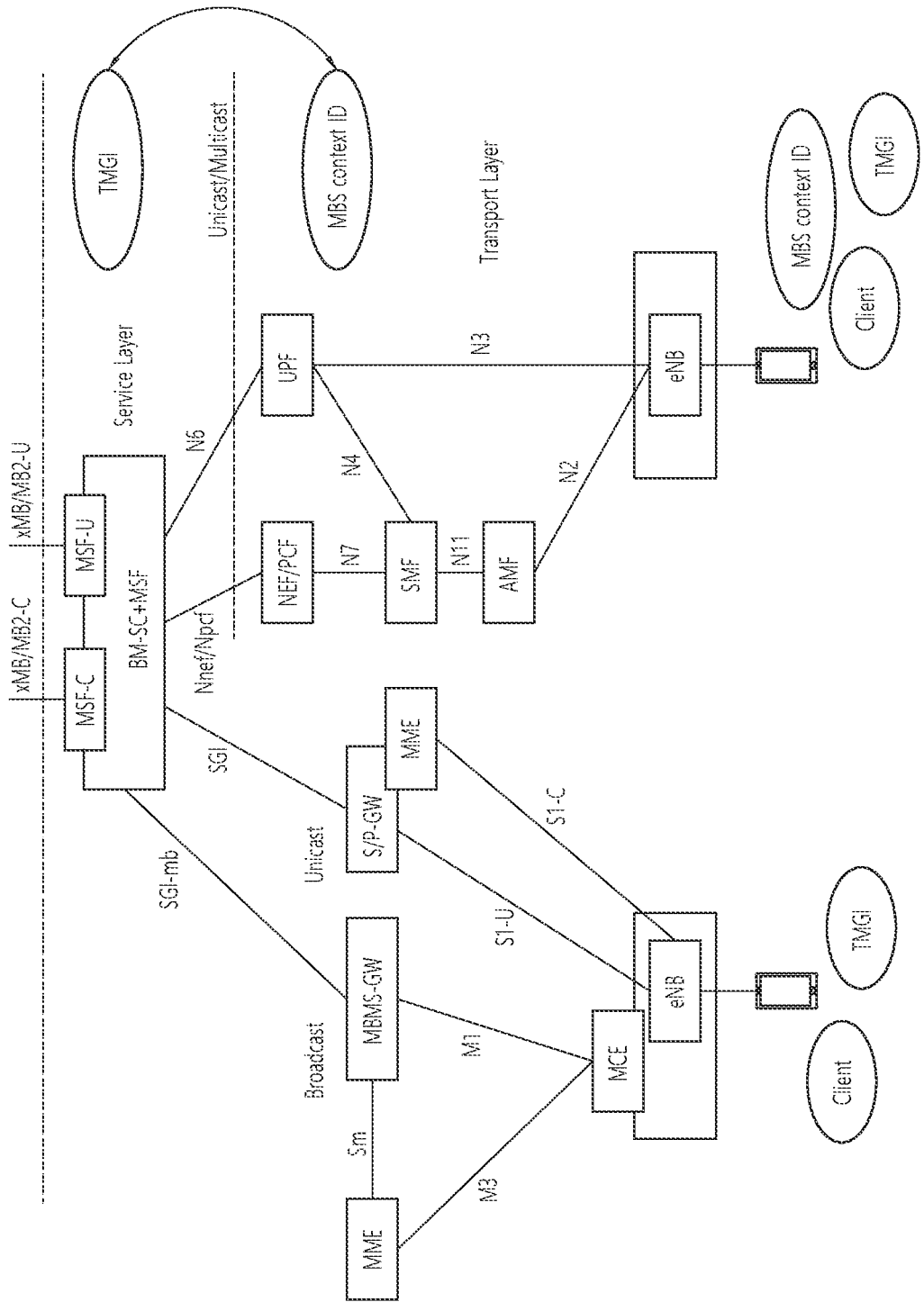
FIG. 6 shows an example of a system architecture for interworking between 5G MBS and E-UTRAN/EPC.

FIG. 6 shows an example of a system architecture for interworking between 5G MBS and E-UTRAN/EPC.

FIG. 6 shows an example of a system architecture for supporting interworking between E-UTRAN/EPC MBMS and 5G MBS in a service layer by co-locating BM-SC and MSF functionalities.

The BM-SC+MSF may expose common reference points to Application Function. Towards the Application Function, the TMGI is used as identifier. The TMGI may also be used as identifier for transport over E-UTRAN/EPC. For 5G MBS, the principles for TMGI and MBS context ID mapping can be used.

In the case of interworking support in the service layer, the TMGI/MBS context ID can always be set for the UE regardless of whether the UE discovers and subscribes to the MBMS/MBS service through E-UTRAN or NR.

When the UE camps on the NR the UE can configure the MBS session context using the MBS context ID.

When the UE camps on the E-UTRAN, the UE may use a procedure for receiving MBMS for TMGI.

In case of mobility, the lossless mechanism can be performed in the service layer between the UE and BM-SC+MSF.

Mobility-related procedures may not be affected by the examples of solutions described above.

When the UE moves to E-UTRAN/EPC, it can start the procedure for receiving MBMS service for TMGI(s). In case of mobility, the lossless mechanism can be performed in the service layer between the UE and BM-SC+MSF.

When a UE moves to NR/5GC, it may initiate a procedure for receiving 5G MBS transmissions for TMGI(s). In case of mobility, the lossless mechanism can be performed in the service layer between the UE and BM-SC+MSF.

The BM-SC+MSF may handle TMGI on two separate systems. The BM-SC+MSF may handle potential retransmissions at the service layer.

The UE can switch between 5G MBS transmissions for the same TMGI as MBMS reception in E-UTRAN.

By performing multicast communication in 5GS, a terminal receiving multicast traffic (e.g., MBS traffic) can move to the Evolved Packet System (EPS). Then, the terminal can receive the MBS traffic received in the 5GS through broadcast communication supported by the Multimedia Broadcast & Multicast Service (MBMS) method in the EPS.

On the other hand, according to the prior art, even after a UE moves from 5GS to EPS, 5GS does not remove the existing multicast context (or MBS context) for this UE. As a result, even though the terminal no longer performs multicast communication in 5GS, there is a problem that the 5G core network and base station (e.g., Next Generation Radio Access Network (NG-RAN)) continue to make efforts to provide services related to multicast communication to terminals.

For example, the base station has a problem of performing unnecessary operations such as continuously receiving multicast traffic for the UE from the User Plane Function (UPF) even though the UE has left the 5GS.

Therefore, in the disclosure of the present specification, when a UE moves to EPS after receiving a multicast service in 5GS, in order to remove the MBS/multicast context that exists for this UE in 5GS, an operation such as transmitting a message in which the UE leaves the multicast service to the 5G network is proposed. An example of why 5GS should remove the existing MBS/multicast context for the UE is as follows. This is because there is a problem that the 5G core network and NG-RAN must make efforts to provide multicast service to the UE, if 5GS does not remove MBS/multicast context, even though the UE no longer receives the multicast service. Even if the UE was the only UE that the NG-RAN should serve for the multicast service, even though the UE left for the EPS, unnecessary operation of continuously receiving multicast traffic from UPF may continue.

When the UE moves to E-UTRAN/EPC, it can start the procedure for receiving MBMS service for TMGI(s). At this time, in order to remove the UE 5G MBS context from the 5G CN (Core Network), for example, the UE may need to perform a procedure for leaving the multicast service.

When the UE moves to NR/5GC, to receive 5G MBS transmission for TMGI, the UE may need to trigger a procedure for setting up/modifying a multicast context and a multicast flow through a PDU session modification procedure.

Mechanisms to reduce, eliminate or recover packet loss may be performed at the service layer between the UE and BM-SC+MBSF and/or at the application layer between the application function of the UE and the application client.

Hereinafter, with reference to FIGS. 7A to 7C, an example of a procedure in which a UE leaves a multicast service through a PDU session modification procedure will be described.

The following drawings are made to explain a specific example of the present specification. Since the names of specific devices or names of specific signals/messages/fields described in the drawings are provided as examples, the technical features of the present specification are not limited to the specific names used in the drawings below.

Figure 7A:
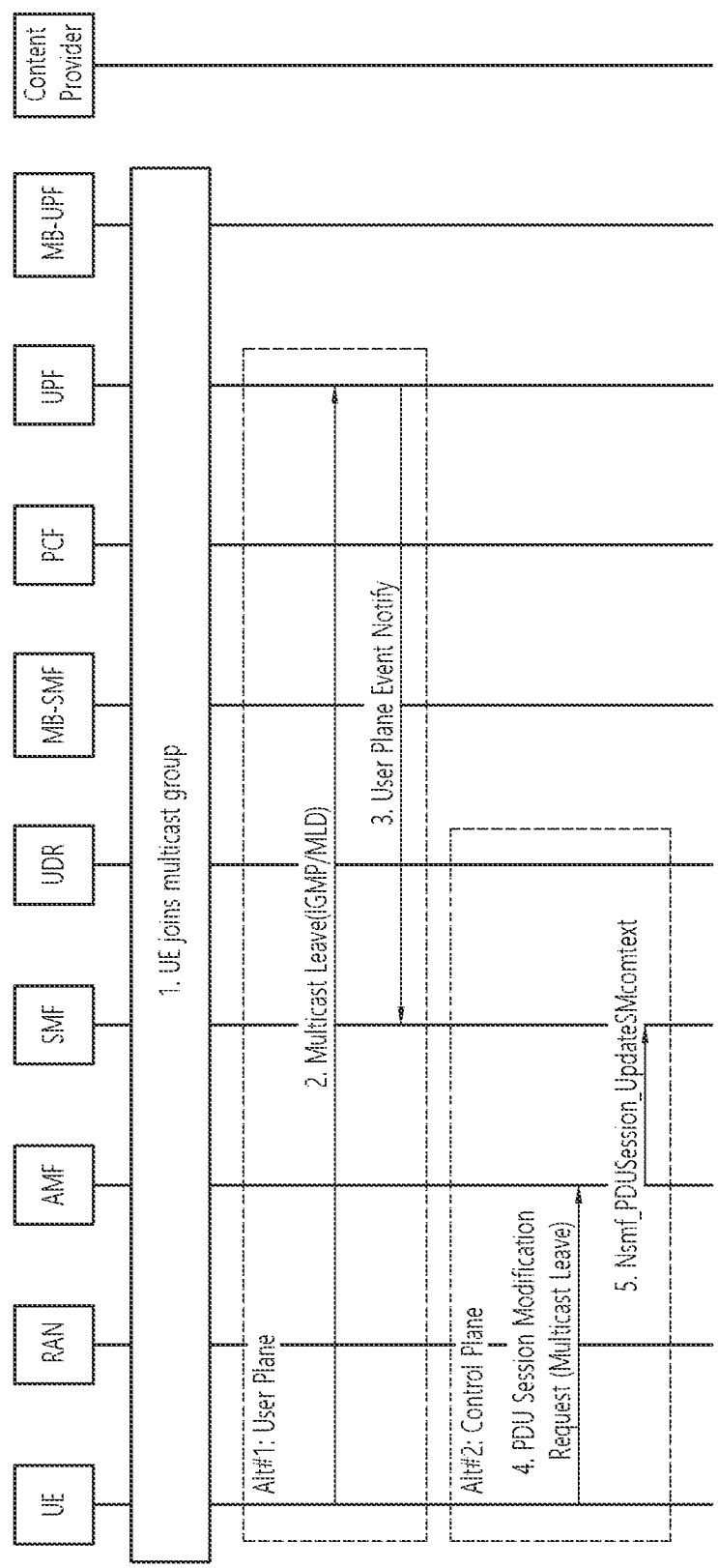
FIGS. 7A to 7C show an example of a PDU session modification procedure for multicast leave.
Figure 7B:
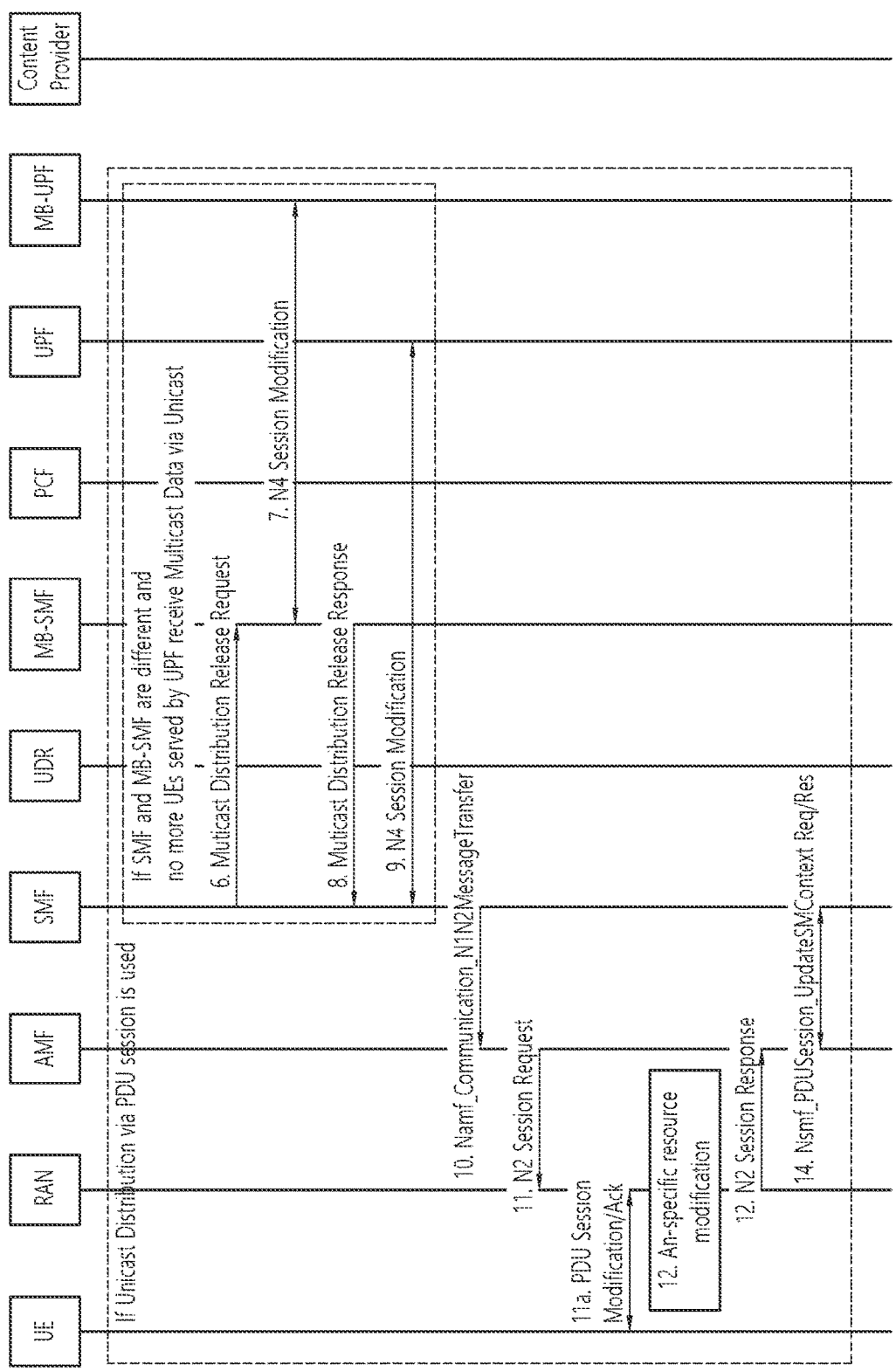
Figure 7C:
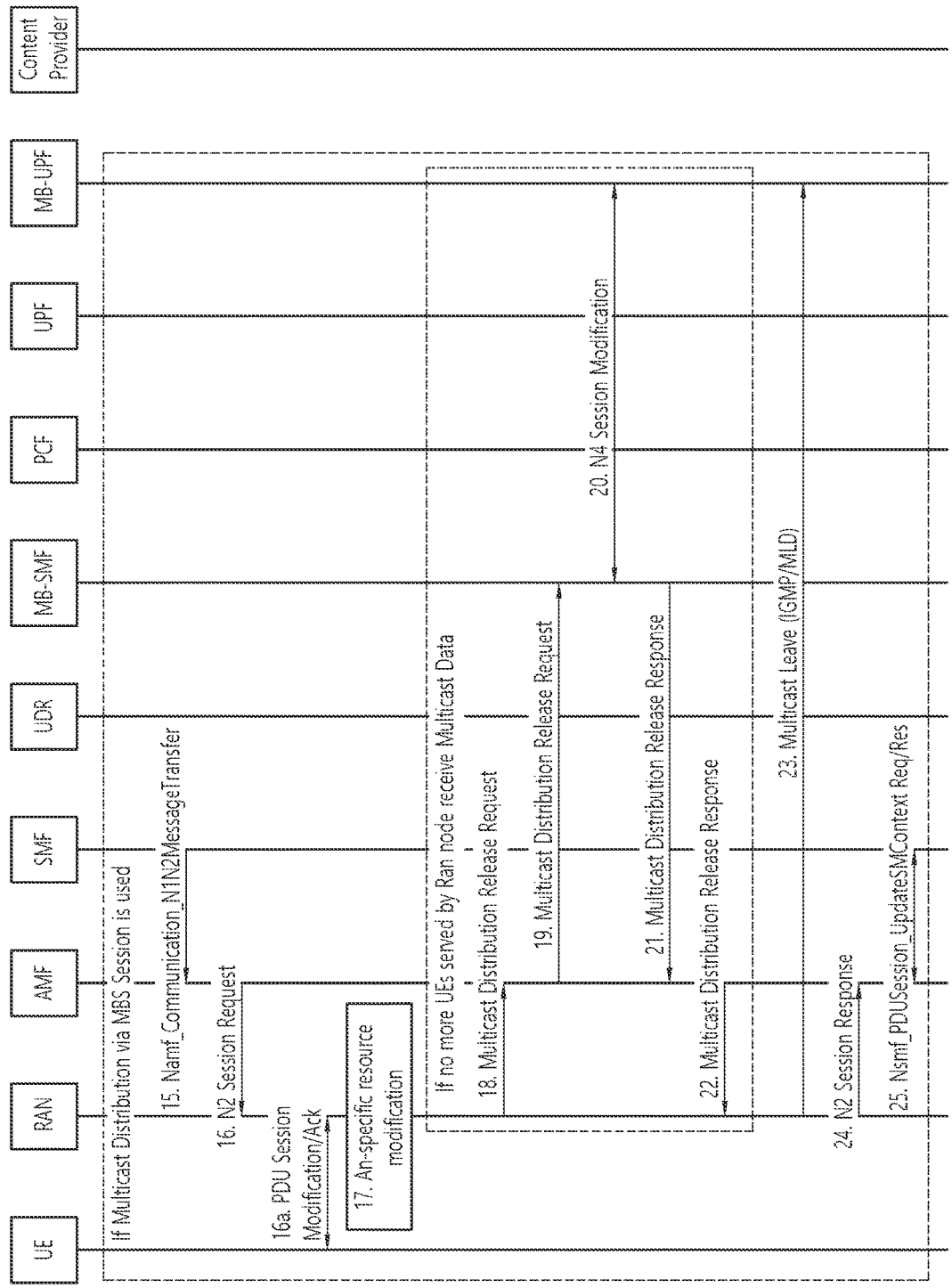

FIGS. 7A to 7C show an example of a PDU session modification procedure for multicast leave.

1) A UE may join one or more multicast services. At any time, the UE may decide to leave the multicast service.

Alternative 1: User plane signaling. Steps 2) and 3) below are examples of operations performed in case of Alternative 1:

2) When the UE wants to leave one or more multicast services, the UE can send a user plane message (e.g., IGMP Leave). The user plane message may include information (e.g., multicast address) related to the multicast service to be left.

3) Upon receiving the leave message, the UPF may perform an operation to inform the SMF. When the SMF receives notification from the UPF, the SMF may initiate a PDU session modification procedure.

Alternative 2: Control plane signaling. Steps 4) and 5) below are examples of operations performed in case of Alternative 2:

4) When the UE wants to leave one or more multicast services, the UE may transmit a PDU session modification request message to the AMF. The PDU session modification request message may include information (e.g., multicast address, etc.) related to the multicast service to be left.

5) AMF may invoke Nsmf_PDUSession_UpdateSMContext (SM context ID, N1 SM container (PDU session modification request message including related multicast service information (e.g., leave indication, multicast service ID, etc.))).

When the UE receives multicast through a unicast PDU session, the following steps 6) to 14) may be applied:

When the SMF and the MB-SMF are different, when multicast data does not need to be distributed to other UEs (e.g. UEs served by the UPF) within one PDU session via unicast distribution, steps 6) to 8) below may be applied. In this case, a shared tunnel between the UPF and the MB-UPF may not be required:

6) The SMF may transmit a request message [including a multicast context/group ID] to the MB-SMF to terminate multicast distribution.

7) Based on the information received in step 6), the MB-SMF may update the multicast session context identified by the multicast context/group ID and configure the MB-UPF so that the MB-UPF no longer distributes multicast data to the UPF.

8) In response to step 6, the MB-SMF may acknowledge the multicast distribution termination request for the SMF. For example, the MB-SMF may transmit a multicast distribution release response message to SMF.

9) To terminate multicast data distribution through unicast PDU sessions, and when steps 6) to 8) are performed, in order to also release resources for receiving multicast data, the SMF may reconfigure the UPF.

The SMF may update the UE as a result of leave handling. In addition, when a dedicated QoS flow is used for unicast transmission of multicast data, the SMF may update the RAN to remove multicast QoS flow related information (e.g., mapped unicast QoS flow information) from the associated unicast PDU session.

10) SMF uses Namf_Communication_NIN2Message (N2 SM information) transmission service, the SMF may request the AMF to notify the RAN node to release the QoS flow previously used to transmit multicast data. N2 SM information may include unicast QoS flow information.

11) A session modification request may be transmitted to the RAN. An N1 SM container (including a PDU Session Modify Command message) may be provided to the UE.

12) The RAN may perform the necessary radio resource modification.

13) The RAN may transmit a session modification response message to the AMF.

14) The AMF may transfer the session modification response message received in step 13) to the SMF through the Nsmf_PDUSession_UpdateSMContext service.

When the UE receives multicast through multicast distribution, the following steps 15) to 25) may be applied.

15) The SMF uses Namf_Communication_NIN2Message (N1 SM container (PDU session modification command (PDU session ID, multicast information ([multicast context ID]], multicast address))), N2 SM information) transfer service, to request the AMF to notify the RAN node that the UE has left the indicated multicast group.

N2 SM information may include multicast flow information (multicast QoS Flow ID and related QoS information) and a multicast service identity that the UE intends to leave.

For reference, when mapped unicast QoS flow information, association between unicast QoS flow and multicast QoS flow, and unicast information of N1 SM container (i.e., QoS rules for unicast flow) are added for multicast distribution, this information can also be deleted in step 15).

16) The AMF may transmit a session modification request message to the RAN. The session modification request message may include multicast service ID and multicast flow information. The RAN may provide the N1 SM container (including the PDU session modification command) to the UE.

The RAN may use the multicast service ID to remove the UE from the multicast session context. In addition, related multicast QoS flow and related unicast QoS flow information may be removed in the UE context.

17) The RAN may perform the necessary radio resource modification.

If the UE is the last UE to leave the indicated multicast service, the RAN releases the associated shared downlink tunnel between the RAN and the MB-UPF, and steps 18 to 22) may be applied.

18) The RAN node selects an AMF to reach the MB-SMF, the RAN node may transmit a multicast user plane distribution release request message (including MB-SMF ID, multicast context/group ID, and downlink tunnel information) to the AMF.

19) AMF may transmit a multicast user plane distribution release request message (including MB-SMF ID, multicast context/group ID, and downlink tunnel information) to MB-SMF.

20) Regarding unicast transmission of the multicast distribution session, the MB-SMF may update the multicast session context identified by the multicast context ID and request the MB-UPF to release the corresponding shared downlink tunnel resource.

21) The SMF may transmit a multicast distribution session release response to AMF.

22) The AMF may deliver a multicast distribution session release response to the RAN node.

23) Related to multicast transmission of a multicast distribution session, after receiving a multicast distribution release response, the RAN may transmit a leave message (e.g., including MLD/IGMP Leave information) to the MB-UPF to stop transmission of MBS data to this RAN node.

24) The RAN may transmit a session modification response to the AMF.

25) The AMF may transfer the session modification response received in step 24 to SMF through Nsmf_P-DUSession_UpdateSMContext service.

The operation in which the UE transmits a leave message from the multicast service to the 5G network can be used only in dual registration mode in which the UE can move between systems while registering in both EPS and 5GS. In addition, even if operating in dual registration mode, the UE can transmit a leave message to the 5G network only when the UE is still in 5GS coverage after moving from 5GS to EPS. In addition, in the case of single registration mode, the UE cannot transmit a leave message to the 5G network after moving to EPS.

A method of supporting MBS service continuity from 5GS to EPS through the service layer is being discussed. However, in the prior art, when a UE receives a multicast service in 5GS and then moves to EPS, the operation of removing the MBS/multicast context existing for the UE in 5GS is not proposed at all.

When supporting continuity of 5GS multicast transmission to EPS MBMS through the service layer, in 5GS, an operation to remove the existing MBS/multicast context for the UE is required. The operation of removing the MBS/multicast context must be performed in all methods, regardless of the EPS/5GS interworking method (e.g., single registration mode or dual registration mode).

III. Disclosure of the Present Specification

Disclosures described later in the present specification may be implemented in one or more combinations (e.g., a combination including at least one of the contents described below). Each of the drawings represents an embodiment of each disclosure, but the embodiments of the drawings may be implemented in combination with each other.

Description of the method proposed in the disclosure of the present specification may be composed of a combination of one or more operations/configurations/steps described below. The following methods described below may be performed or used in combination or complementary.

In the disclosure of the present specification, a method for supporting multicast communication when a UE moves to EPS while performing multicast communication in 5GS is described through various examples. For example, when a UE moves from 5GS to EPS, 5GS multicast transmission for the UE can support service continuity according to EPS MBMS communication for the UE through the service layer. In various examples of the disclosure of the present specification, an operation of removing an MBS/multicast context (MBS context and/or multicast context) existing for a UE moved from 5GS after the UE moves from 5GS to EPS is described. An operation of removing an MBS/multicast context (MBS context and/or multicast context) existing for a UE moved in 5GS is composed of a combination of one or more operations/configurations/steps among various examples below.

In the disclosure of the present specification, MBS may be interpreted the same as MBMS (Multimedia Broadcast/Multicast Service).

In the disclosure of the present specification, an MBS session may be interpreted as including an MBS multicast session and an MBS broadcast session. In the disclosure of the present specification, MBS data and/or MBS traffic may be interpreted as including MBS multicast data and/or MBS multicast traffic and MBS broadcast data and/or MBS broadcast traffic.

In the disclosure of the present specification, an MBS session may be used interchangeably with an MB session. In other words, in the disclosure of the present specification, an MBS session and an MB session may be used as terms of the same meaning.

In the disclosure of the present specification, session and service may be used interchangeably. In other words, in the disclosure of the present specification, sessions and services may be used as terms of the same meaning.

In the disclosure of the present specification, multicast service, multicast session, and multicast group may be used interchangeably. In other words, in the disclosure of the present specification, multicast service, multicast session, and multicast group may be used as terms having the same meaning.

In the disclosure of the present specification, the NG-RAN may mean gNB and may include both gNB and next generation eNB (ng-eNB).

For support of MBS in Evolved General Packet Radio Service (GPRS) and Evolved Packet System (EPS), TS 23.246 V15.1.0, TS 23.468 V15.1.0, TS 26.348 V16.0.0, etc. can be referred to, and the following will mainly describe the contents proposed in the disclosure of the present specification.

For reference, in the following various examples, an operation of removing an MBS/multicast context existing for a UE in 5GS may be interpreted as an operation of removing/deleting a UE from a multicast session.

Operations proposed in various examples of the present specification may be applied to both single registration mode and dual registration mode among EPS/5GS interworking schemes, or may be applied to only one of the two modes. For reference, in single registration mode, one active mobility state can exist at a given time. For example, when the UE is in single registration mode, the UE may be in 5GC NAS mode or EPC NAS mode. A UE in dual registration mode can maintain independent registration for 5GC and EPC. For example, a UE in dual registration mode can independently maintain 5G-Global Unique Temporary Identifier (GUTI) and EPC-GUTI.

First, with reference to FIGS. 8A and 8B, an example of a procedure for configuring and creating a multicast session will be described.

The following drawings are made to explain a specific example of the present specification. Since the names of specific devices or names of specific signals/messages/fields described in the drawings are provided as examples, the technical features of the present specification are not limited to the specific names used in the drawings below.

Figure 8A:
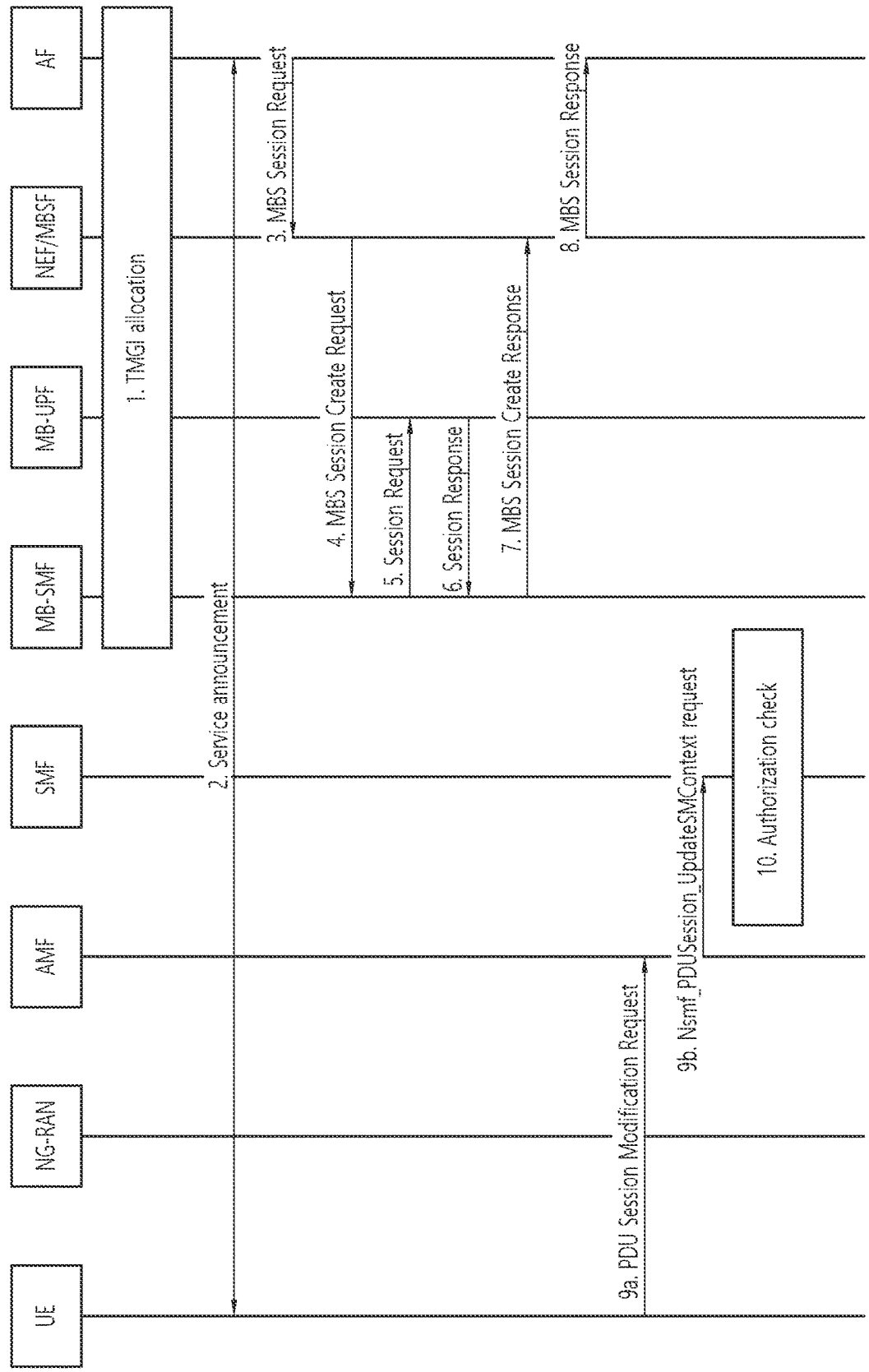

FIGS. 8A and 8B show an example of a procedure for generating a multicast session.

1) AF may request TMGI, which is an identifier for identifying a new multicast session, from 5GC. Then, the MB-SMF can allocate TMGI and provide the allocated TMGI to AF. This TMGI allocation process performed between AF and MB-SMF may be performed through NEF/MBSF. Here, MBSF means Multicast-Broadcast Service Function.

2) AF may perform Service Announcement to the UE. Through this, the AF may provide multicast session related information to the UE, including TMGI (i.e., MBS Session ID information).

3) The AF may transmit an MBS Session Request message including multicast session-related information such as TMGI (i.e., MBS Session ID information) and QoS requirements to NEF/MBSF in order to configure the multicast session as 5GS.

4) The NEF/MBSF can search for an MB-SMF that will serve the multicast session. The NEF/MBSF may perform such MB-SMF discovery through Network Repository Function (NRF). The NEF/MBSF may select an MB-SMF and transmit an MBS Session Create Request message to configure the multicast session to the selected MB-SMF.

5) The MB-SMF may transmit a message (e.g., Session Request message) requesting reservation of user plane resources for servicing the multicast session to the MB-UPF.

6) The MB-UPF may transmit a message (e.g., Session Response message) responding to the MB-SMF's request.

7) The MB-SMF may transmit an MBS Session Create Response message to the NEF/MBSF.

8) The NEF/MBSF may transmit an MBS Session Response message to the AF.

9a-9b) In order for the UE to join the multicast session, the UE may transmit a PDU Session Modification Request message including a join request to the AMF. The PDU Session Modification Request message may be transmitted to SMF through AMF. The Join request may include TMGI (i.e., MBS Session ID information) which is identification information for identifying a multicast session.

10) The SMF may check whether the UE can receive the service for the multicast session requested by the UE to join.

11) If the SMF does not have the context/information for the multicast session requested for the Join, the SMF can acquire context/information about multicast session from MB-SMF. The SMF may search for an MB-SMF serving the multicast session using the NRF.

12) MB-SMF transmits N2 SM information including multicast QoS Flow(s) information for multicast session and N1 SM container including PDU Session Modification Command message to AMF. For example, the SMF may transmit an Nsmf_PDUSession_UpdateSMContext response message (including N2 SM information including multicast QoS Flow(s) information for a multicast session and a PDU Session Modification Command message) to the AMF.

13) AMF may transmit information (e.g., N2 SM information and/or PDU Session Modification Command message including multicast QoS Flow(s) information for multicast session) received from the MB-SMF to NG-RAN.

14a-14b) The NG-RAN may transmit an MBS Session Request message to MB-SMF through the AMF. For example, the NG-RAN may transmit an N2 message including an MBS Session Request message to the AMF, and the AMF may transmit an Nmbsmf_Reception Request message including the MBS Session Request message to the MB-SMF.

14c) The MB-SMF may configure the MB-UPF to transmit multicast session data in the 5GC shared MBS traffic delivery method.

14d to 14e) MB-SMF may transmit an MBS Session Response message (e.g., Nmbsmf_Reception Response message) to NG-RAN through AMF.

15) The NG-RAN may send and receive AN specific signaling (i.e., RRC message) with the UE to generate a radio resource for a multicast session. At this time, the NG-RAN may transmit the PDU Session Modification Command message received in step 13 to the UE.

16) The NG-RAN may transmit a response message (e.g., N2 message) to the message received from the SMF through the AMF in step 13 to the AMF. For example, this response message may include a response message for the PDU Session Modification Command.

17) AMF may deliver the message transmitted by NG-RAN to SMF. For example, the AMF may transmit an Nsmf_PDUSession_UpdateSMContext response message including a message transmitted by the NG-RAN (e.g., a message including a response message to the PDU Session Modification Command) to the SMF.

18) SMF may transmit a response message (e.g., Nsmf_PDUSession_UpdateSMContext response message) to AMF.

Hereinafter, the disclosure of the present specification will be described with reference to the first to fourth examples of the disclosure of the present specification. The first to fourth examples of the disclosure of the present specification described below may be implemented in combination.

1. A First Example of the Disclosure of the Present Specification

In the first example of the disclosure of the present specification, an example of an operation in which AMF removes an MBS/multicast context that exists for a UE that has moved from 5GS to EPF will be described. A method such as the example described in the first example of the disclosure of the present specification may be applied to a procedure such as, for example, MBS Session setup using flexible radio resources. However, this is only an example, and the method described in the first example of the disclosure of the present specification may be used in situations other than a procedure such as MBS Session setup using flexible radio resources.

First, with reference to the example of FIG. 9, an example of a session leave procedure that can be applied to various operations of the first example disclosed herein will be described.

The following drawings are made to explain a specific example of the present specification. Since the names of specific devices or names of specific signals/messages/fields described in the drawings are provided as examples, the technical features of the present specification are not limited to the specific names used in the drawings below.

Figure 9:
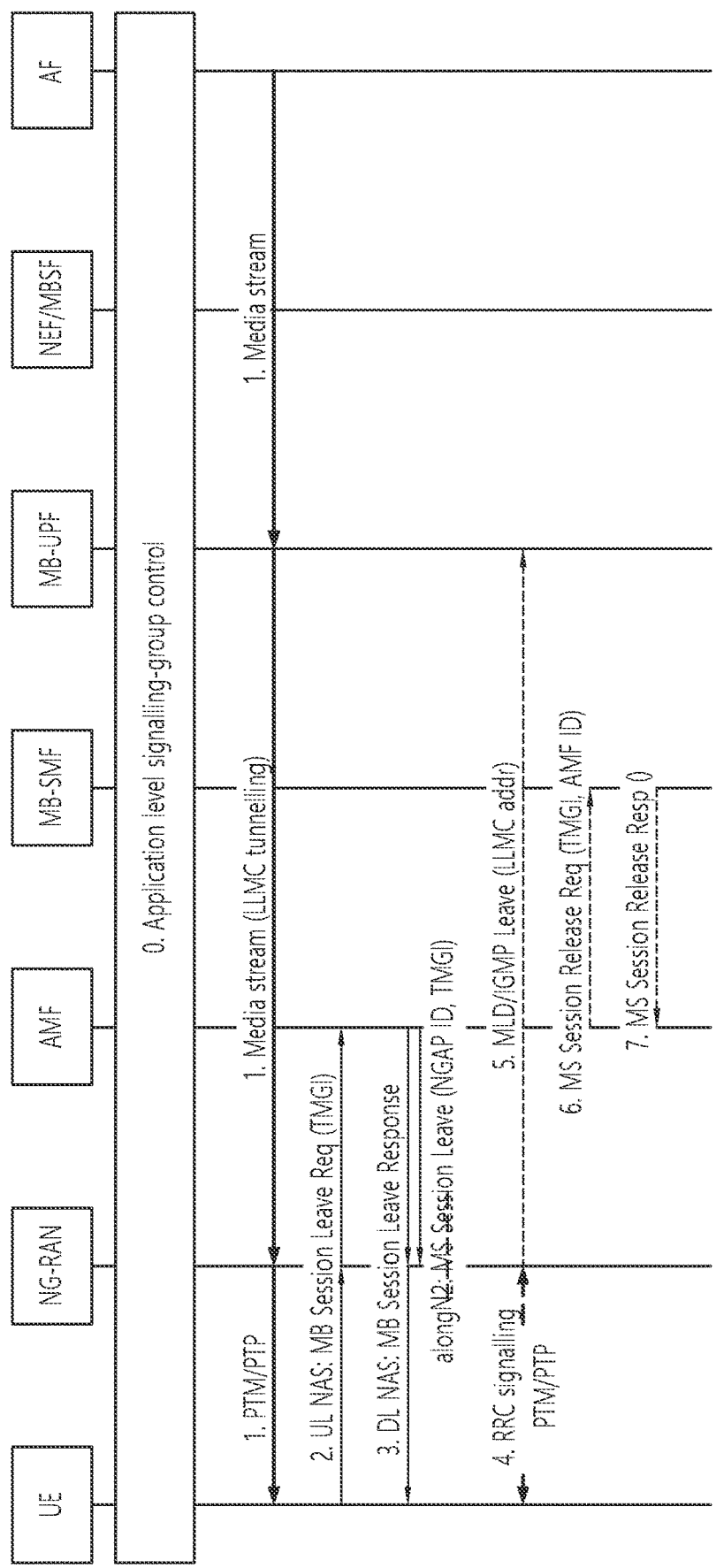
FIG. 9 shows an example of a Session Leave procedure.

FIG. 9 shows an example of a Session Leave procedure.

For reference, the session leave procedure according to the example of FIG. 9 may be a session leave procedure based on section 6.2.2.5 of TR 23.757v1.0.0.

Session Leave (e.g., session leave) procedure can be used to inform the 3GPP network that the MB session the UE is interested in has been terminated. During the Session Leave procedure, the distribution area of the multicast session may be adjusted if necessary.

0) At the application level, a subliminal decision on whether or not the UE leaves the group can be performed. For example, the UE's application layer may determine whether the UE leaves a group of MB sessions.

1) Media streams may exist before the UE leaves. In this case, the UE can receive media through Point-To-Multipoint (PTM) or Point-To-Point (PTP).

2) The UE may transmit an Uplink (UL) NAS MB Session Leave request message (including Temporary Mobile Group Identity (TMGI)) to the AMF. The AMF can remove TMGI from the UE Context.

3) The AMF can generate a DL NAS MB Session Leave response message and piggyback the DL NAS MB Session Leave response message to the N2 MB Session Leave message (including Next Generation Application Protocol (NGAP) ID, TMGI). The NG-RAN may remove TMGI from the UE context of the NG-RAN.

4) The NG-RAN can adjust PTM/PTP transmission if necessary.

5) If this UE is the last UE using an MB session in this NG-RAN (i.e., TMGI is no longer stored in the UE Context of the NG-RAN node), to stop the media stream for this NG-RAN node, the NG-RAN may transmit a Leave message (including LL MC Address (Lower Layer Multicast IP Address)). Then, the NG-RAN may delete the MB session context.

6) If this UE is the last UE that is part of the MB session in the AMF, to unsubscribe from an MB session, the AMF may transmit an MB Session Release request message (including TMGI and AMF ID) to MB-SMF. MB-SMF can remove AMF from MB-SMF MB session context.

For the UE, if 5GC Individual MBS traffic delivery (5GC individual MBS traffic delivery) is applied, the AMF may inform the SMF that 5GC Individual MBS traffic delivery for the MBS session should be stopped in the PDU session. The SMF may instruct the PDU Session Anchor (PSA)-UPF to stop delivering the MBS data stream to the PDU session. If this UE is the last UE to which 5GC Individual MBS traffic delivery is applied in the PSA-UPF, the SMF may instruct the PSA-UPF to leave the multicast tree of the MB-UPF.

7) The MB-SMF may transmit an MB Session Release Response message to the AMF. The AMF may delete MB session context.

The AMF may recognize that the UE has moved from 5GS to EPS. When AMF recognizes that the UE has moved from 5GS to EPS, (e.g., the AMF may recognize based on operation of AMF receiving Relocation Complete Notification message from MME in 5GS to EPS handover procedure using N26 interface or operation of AMF receiving Context Ack message from MME in 5GS to EPS Idle mode mobility procedure using N26 interface), the AMF may perform one or more of the following operations (Examples 1 to 3 described below). In addition, even when the AMF recognizes that the UE has to move to the EPS, it may perform one or more of the following examples (Examples 1 to 3 described below):

Example 1) the AMF may provide information that the UE no longer needs to receive multicast service to the NG-RAN serving the UE. The information that the UE no longer needs to receive the multicast service may include information (e.g., TMGI, MBS Session ID, etc.) identifying the multicast session(s) in which the UE received the service. The information may be interpreted as information instructing the NG-RAN to remove information about the UE from the context(s) managed to service the multicast session. In other words, when the NG-RAN receives information from the AMF that the UE no longer needs to receive multicast service, the NG-RAN may perform an operation of removing information about the UE from the context(s) managed to service the multicast session. In addition, the information that the UE no longer needs to receive multicast service may be interpreted as information indicating that the UE leaves from multicast session(s).

The information may be transmitted by being included in a message transmitted by AMF to NG-RAN (UE Context Release Command message transmitted by AMF to NG-RAND in 5GS to EPS handover procedure using N26 interface), the information may be included in a separate message and/or a new message (e.g., the N2 MB Session Leave message described in step 3 of the example of FIG. 9) and transmitted.

Example 2) the AMF may perform the operations described in steps 6 and 7 of the example of FIG. 9. This may mean that the UE (e.g., the UE to leave) was the last UE among the UEs receiving the multicast session service by the AMF. In this case, the operation performed by the AMF may be interpreted as an operation informing the MB-SMF that it no longer needs to service this multicast session. For reference, "the UE receiving the multicast session service" may be interpreted as a UE managed and/or serviced by the AMF.

Example 3) AMF may remove information about the UE from context(s) managed to service a multicast session. For example, the AMF may remove information about the UE from context(s) (e.g., multicast session related context) managed to provide a service related to a multicast session. The context may be MB Session Context.

According to example 1) described above, the AMF may transmit information that the UE no longer needs to receive multicast service to the NG-RAN. For reference, the information that the UE no longer needs to receive multicast service may include information (e.g., TMGI, MBS Session ID, etc.) identifying multicast session(s) in which the UE received the service. When the NG-RAN receives the information of Example 1) from the AMF (e.g., information that the UE no longer needs to receive multicast service), the NG-RAN may perform one or more of the following examples:

a) The NG-RAN may remove information about the UE from context(s) (e.g., context related to multicast session) managed to service a multicast session. The context may be MB Session Context. If the UE is the last UE among the UEs receiving the multicast session service (e.g., when the last UE among UEs managed/serviced by NG-RAN for multicast session), the NG-RAN may additionally perform an operation of releasing radio resources for the multicast session.

b) The NG-RAN may perform the operation of step 5) according to the example of FIG. 9. For example, if the UE was the last UE among the UEs receiving the multicast session service, the NG-RAN may perform an operation to no longer receive traffic of the multicast session from the 5G core network (e.g., the UPF or the MB-UPF).

2. The Second Example of the Disclosure of the Present Specification

In the second example of the disclosure of the present specification, an example of an operation in which the SMF removes an MBS/multicast context that exists for a UE that has moved from 5GS to EPS will be described. The method described in the second example of the disclosure of the present specification may be applied to a procedure such as Integrated Multicast and Unicast Transport, for example. However, this is only an example, and the method described in the second example of the disclosure of the present specification may be used in situations other than procedures such as Integrated Multicast and Unicast Transport.

The SMF may recognize that the UE has moved to EPS. For example, the SMF may recognize that the UE has moved from 5GS to EPS based on operations such as, Step 2a of 5GS to EPS handover procedure using N26 interface (e.g., SMF receiving Nsmf_PDUSession_ContextRequest message from the AMF), or step 10a (e.g., SMF receiving Nsmf_PDUSession_UpdateSMContextRequest message from the AMF), or step 12e (e.g., SMF receiving Nsmf_PDUSession_ReleaaseSMContext message from the AMF), or step 14a (e.g., operation of the SMF receiving Modify bearer Request message from the SGW), or step 15 of TS 23.502 4.11.1.3.2 5GS to EPS Idle mode mobility procedure using N26 interface (Example: the AMF receives NUdm_UECM_DeregistrationNotification message from HSS+UDM), or step 15b (e.g., operation of SMF receiving Nsmf_PDUSession_ReleaseSMContext Request message from AMF), or Step 13 of the 5GS to EPS Mobility procedure (e.g. UE requested PDN Connectivity), or Step 14 (e.g. release procedure for transferred PDU session initiated by PGW-C+SMF), etc. If the SMF recognizes that the UE has moved to EPS, the SMF may perform one or more of the following examples (Example 1, Example 1a, Example 1b, Example 2, Example 3, etc.). Alternatively, the SMF may perform one or more of the following operations when recognizing that the UE needs to move to the EPS. In the above, the SMF recognizing that the UE has moved to the EPS or recognizes that the UE must move to the EPS, may be interpreted as a case in which the SMF recognizes that the UE needs to release the PDU Session or a case in which the SMF receives a PDU Session release request from the AMF.

Example 1) SMF can provide information that the UE no longer needs to receive multicast service to the NG-RAN serving the UE. The information may include information (e.g., TMGI, MBS Session ID, etc.) identifying multicast session(s) in which the UE was serviced. The information may be interpreted as information instructing the NG-RAN to remove information about the UE from context(s) (e.g., multicast session related context) managed to service a multicast session. For example, when the NG-RAN receives information that the UE no longer needs to receive multicast service, the NG-RAN may remove information about the UE from multicast session related context. The information may be interpreted as information indicating that the UE has left in multicast session(s).

The information transmitted by SMF may be transmitted to NG-RAN via AMF. For example, information indicating that the UE no longer needs to receive the multicast service may be included in Namf_Communication_N1N2Message described in step 15 according to the examples of FIGS. 7A to 7C and transmitted. For example, the SMF transmits a Namf_Communication_N1N2Message (including information that the UE no longer needs to receive multicast service) to the AMF, the AMF may transmit information that the UE no longer needs to receive multicast service to the NG-RAN.

Examples 1a and 1b below are examples in which the MB-SMF performs the operation performed by the SMF in Example 1) described above.

Example 1a) As in the example of procedures such as Integrated Multicast and Unicast Transport, NG-RAN and MB-SMF can send and receive signaling through the AMF. In this case, the MB-SMF may provide information that the UE no longer needs to receive multicast service to the NG-RAN serving the UE. That is, the MB-SMF can perform the operation performed by the SMF in Example 1). To this end, if the SMF recognizes that the UE has moved to the EPS (or if the SMF detects that the UE has stopped receiving multicast service), the SMF may inform the MB-SMF of this. When the SMF informs the MB-SMF that the UE has moved to EPS (or that the UE has stopped receiving multicast service), the SMF may provide the information of the NG-RAN node serving the UE to the MB-SMF. If the UE was receiving service for multiple multicast sessions, the SMF may provide information that the UE no longer needs to receive multicast service to the MB-SMF serving each multicast session among multiple multicast sessions of the UE.

Example 1b) The MB-SMF may perform the operation performed by the SMF in Example 1). When the MB-SMF recognizes that the UE has moved to EPS (or detects that the UE has stopped receiving multicast service), the MB-SMF can provide information that the UE no longer needs to receive multicast service to the NG-RAN serving the UE. This provision of information is transmitted to the NG-RAN through the AMF. That is, the information transmitted by MB-SMF can be transmitted to NG-RAN through AMF. In order for the MB-SMF to recognize that the UE is moving to EPS, when a UE receiving multicast session service moves to EPS, the MB-SMF can subscribe to an event exposure service to notify the AMF of the movement of the UE (if subscribing to this service, the AMF can inform the MB-SMF of the movement of the UE). The event in which the MB-SMF subscribes in AMF may be a newly defined event (e.g., UE moves to EPS or interworking with EPS), or an event in which the MB-SMF can infer the movement of the UE (the UE has moved to the EPS) among existing events (e.g., Location Report, UE moving in or out of a subscribed "Area Of Interest", Number of UEs served by the AMF and located in "Area Of Interest", Time zone changes (UE Time zone), Access Type changes (3GPP access or non-3GPP access), Registration state changes (Registered or Deregistered), Connectivity state changes (IDLE or CONNECTED), UE loss of communication, UE reachability status, UE indication of switching off SMS over NAS service, Subscription Correlation ID change (implicit subscription), UE Type Allocation code (TAC). Frequent mobility re-registration, Subscription Correlation ID addition (implicit subscription), User State Information in 5GS, UE access behavior trends, events defined in the prior art, such as UE location trends and Total number of Mobility Management transactions). It is assumed that the MB-SMF performs an operation of storing/managing UEs receiving a multicast session managed by the MB-SMF.

Example 2) The SMF may remove information about the UE from context(s) (e.g., multicast session related context) managed to service a multicast session. This may be interpreted as removing the UE context stored by the SMF for the multicast session. For the proposal of the present specification, SMF may need to store/manage the context for each multicast session.

Example 3) SMF considers that the UE has left the multicast session. Additionally, the SMF may inform other SMFs (that is, when another SMF or MB-SMF serves the multicast session) serving the multicast session of the UE's leave.

In Examples 1) to 3) described above, if the SMF (i.e., the SMF serving the PDU session of the UE) and the SMF serving the multicast session (e.g., this SMF is assumed to be MB-SMF) are different, the SMF may perform the operations of Example 1) and/or Example 2) after performing interaction with the MB-SMF.

In Examples 1) to 3) described above, the SMF may be an SMF serving a PDU Session through which the UE transmits a join request for receiving a multicast service.

According to example 1) described above, the SMF may transmit information that the UE no longer needs to receive multicast service to the NG-RAN. When the NG-RAN receives the information described in 1) above (e.g., information that the UE no longer needs to receive multicast service) from the SMF, it may perform one or more of the following operations.

a) NG-RAN may remove information about the UE from context(s) (e.g., context related to multicast session) managed to service a multicast session. If the UE was the last UE among the UEs receiving the multicast session service (e.g., the last UE among the UEs managed/serviced by the NG-RAN for the multicast session), the NG-RAN may additionally perform an operation of releasing radio resources for the multicast session.

b) The NG-RAN performs the operation of step 18 according to the example of FIG. 9. For operations after the NG-RAN performs step 18 in the example of FIG. 9, refer to steps 19 and operations after step 19 in the example of FIG. 9. For example, if the UE was the last UE among the UEs receiving the multicast session service, the NG-RAN may perform an operation to no longer receive traffic of the multicast session from the 5G core network (e.g., the UPF or the MB-UPF).

3. Third example of disclosure of the present specification

In the third example of the disclosure of the present specification, an example of an operation in which the NG-RAN removes an MBS/multicast context that exists for a UE that has moved from 5GS to EPF will be described.

The NG-RAN may recognize that the UE has moved to EPS or that the UE should move to EPS. For example, the NG-RAN may recognize that the UE has moved to the EPS or that the UE needs to move to the EPS based on operations such as, Step 1 of 5GS to EPS handover procedure using N26 interface (e.g. NG-RAN transmits handover required message to AMF), or step 11a (e.g. AMF transmits a handover command message to NG-RAN), or step 21c (e.g. AMF transmits UE Context Release Command message to NG-RAN), or when NG-RAN redirects UE to EPS (this can be interpreted as RRC connection release with redirection or RRC release with redirection or NG-RAN sending an RRCRelease message (including redirected E-UTRA carrier information) to the UE), etc. If the NG-RAN recognizes that the UE has moved to the EPS or that the UE needs to move to the EPS, the NG-RAN may perform one or more of the following examples.

Example 1) NG-RAN may remove information about the UE from context(s) (e.g., multicast session related context) managed to service a multicast session. The context may be MB Session Context. If the UE was the last UE among the UEs receiving the multicast session service, the NG-RAN may additionally perform an operation of releasing radio resources for the multicast session.

Example 2) If the NG-RAN is the last UE among UEs receiving multicast session service, the NG-RAN may perform an operation to no longer receive traffic of the multicast session from the 5G core network (e.g., the UPF or the MB-UPF). For reference, regarding the operation for the NG-RAN to no longer receive the traffic of the multicast session from the 5G core network (e.g., UPF or MB-UPF), for example, the content described in b) of the first example of the disclosure of the present specification and the content described in b) of the second example of the disclosure of the present specification may be referred to.

Example 3) The NG-RAN may provide information that the UE no longer needs to receive multicast service to the 5G core network. The information that the UE no longer needs to receive the multicast service may include information (e.g., TMGI, MBS Session ID, etc.) identifying the multicast session(s) that the UE received the service. The information may be interpreted as information instructing the 5G core network to remove information about the UE from context (s) (e.g., multicast session related context) managed to service a multicast session. For example, when the 5G core network receives information from NG-RAN that the UE no longer needs to receive multicast service, the 5G core network may remove information about the UE from multicast session related context. The information may be interpreted as information indicating that the UE has left in multicast session(s). Here, the 5G core network may mean one or more network functions (e.g., AMF, SMF, MB-SMF, etc.). If the above information needs to be delivered to multiple 5G core network functions, if the NG-RAN provides the information to one NF, the NF receiving it may forward the information to another NF(s).

According to the description in the third example of the disclosure of the present specification, the following may be applied.

For service layer continuity between E-UTRAN/EPC MBMS and NR/5GC MBS, the following description may be applied.

It can be assumed that the 5G CN (Core Network) can know that the UE has moved to the EPC, and as a result, the 5G CN knows when to trigger the UE MBS context removal. For reference, according to the prior art, how the 5G CN understands that the UE has moved to the EPC and how the 5G CN triggers the UE MBS context removal are not discussed at all.

In this regard, the disclosure herein describes an example of how the 5G CN understands that the UE has moved to EPC and/or an example of how the 5G CN triggers UE MBS context removal.

Mobility-related procedures may not be affected by the contents described in the disclosure of the present specification.

When a UE moves to E-UTRAN/EPC, the UE may start a procedure defined in the prior art to receive MBMS service for TMGI(s).

In the case of N26-based interworking from 5GS to EPS, the source NG-RAN may receive a UE context release command message from the AMF. When the source NG-RAN releases resources for PDU session(s) associated with the UE due to the UE context message, the source NG-RAN may remove the UE from the multicast session context (if the multicast session context exists). If the UE is the last UE in the multicast session context, the source NG-RAN may perform an operation for multicast user plane distribution release for the multicast service (which may correspond to steps 17 to 25 in FIGS. 7A to 7C).

For interworking without N26 interface (interworking from 5GS to EPS), the UE may perform a procedure for leaving the multicast service (e.g., the procedure described in the examples of FIGS. 7A to 7C). Then, the source NG-RAN may remove the UE from the multicast session context (if the multicast session context exists). The UE may trigger such a procedure depending on the UE implementation.

When a UE moves to NR/5GC, in order to receive 5G MBS transmissions for TMGI(s), the UE may trigger multicast context and multicast flow setup/modification through a PDU session modification procedure.

Mechanisms to reduce, eliminate or recover packet loss may be performed at the service layer between the UE and BM-SC+MBSF and/or at the application layer between the application function of the UE and the application client.

Mechanisms for reducing, eliminating or recovering packet loss may be performed at the service layer between the UE and Broadcast and Multicast Service Center (BM-SC)+MBSF and/or at the application layer between the application function of the UE and the application client.

4. The Fourth Example of the Disclosure of the Present Specification

In the fourth example of the disclosure of the present specification, an example of an operation in which AF (or Application Server or Content Provider) removes an existing MBS/multicast context for a UE that has moved to EPS will be described.

The AF can recognize that the UE has moved to EPS. For example, the AMF is explicitly or implicitly provided with information that the UE has moved to the EPS, the AMF may explicitly or implicitly receive information that the UE has moved to the EPS from the 5G core network and/or EPC from the UE. When the AMF recognizes that the UE has moved to the EPS, the AMF may perform an operation such as the following example.

Example 1) AF can provide information that the UE no longer needs to receive multicast service to the 5G core network. The information may include information (e.g., TMGI, MBS Session ID, etc.) identifying multicast session (s) in which the UE was serviced. The information may be interpreted as information instructing the 5G core network and/or NG-RAN (This is the NG-RAN serving the UE) to remove information about the UE from the context(s) managed to service the multicast session. For example, when the 5G core network and/or NG-RAN receives information that the UE no longer needs to receive multicast service, the 5G core network and/or NG-RAN may remove information about the UE from multicast session related context. The information may be interpreted as information indicating that the UE has left in multicast session(s). The AF may additionally provide location information (e.g., Cell ID, TAI, etc.) where the UE was last located in 5GS (the UE last camped-on) to the 5G core network and/or NG-RAN. The AF may receive location information (e.g., Cell ID, TAI, etc.) where the UE was last located in 5GS (the UE last camped on) from the UE, from the 5G core network, and/or from the EPC. The AF uses location information (e.g., Cell ID, TAI, etc.) where the UE was last located in 5GS (the UE last camped on), and the 5G core network may determine the NG-RAN and/AMF serving the UE.

When the AF provides information to the SMF that the UE no longer needs to receive multicast service, the AF may provide information that the UE no longer needs to receive multicast service to the SMF serving the PDU Session used by the UE for multicast service join/leave request. To this end, the AF may use the UE's IP address information (IP address information can be provided from the UE, from the 5G core network, and/or from the EPC) for the PDU session to allow the 5G core network to determine the SMF serving the PDU session.

In the above, the 5G core network may mean one or more of the MB-SMF, the SMF, and the AMF. The NG-RAN may receive information provided by AF through the 5G core network function. When information that the UE no longer needs to receive multicast, service needs to be delivered to multiple 5G core network functions, if an AF provides information to one NF, the NF receiving it may forward it to another NF(s).

When the NG-RAN receives the information described in Example 1) (e.g., information that the UE no longer needs to receive multicast service), the NG-RAN may perform one or more of the following operations.

a) The NG-RAN may remove information about the UE from context(s) (e.g., context related to multicast session) managed to service a multicast session. If the UE was the last UE among the UEs receiving the multicast session service, the NG-RAN may additionally perform an operation of releasing radio resources for the multicast session.

b) If the NG-RAN is the last UE among the UEs receiving the multicast session service, the NG-RAN may perform an operation to no longer receive traffic of the multicast session from the 5G core network (e.g., UPF or MB-UPF). For reference, regarding the operation for the NG-RAN to no longer receive the traffic of the multicast session from the 5G core network (e.g., UPF or MB-UPF), for example, the content described in b) of the first example of the disclosure of the present specification and the content described in b) of the second example of the disclosure of the present specification may be referred to.

Hereinafter, an example of an operation according to various examples of the third example of the disclosure of the present specification will be described with reference to the example of FIG. 10. For reference, the description according to FIG. 10 is only an example, and the scope of the disclosure of the present specification is not limited by FIG. 10. For example, among the operations described in various examples of the disclosure of the present specification, operations not shown in the example of FIG. 10 may also be included in the scope of the disclosure of the present specification.

In the example of FIG. 10, various operations are disclosed centering on the operation of removing the existing MBS/multicast context for the UE in which the NG-RAN has moved from 5GS to EPF, but this is only an example. Various operations described in the first to fourth examples of the disclosure of the present specification may also be performed in the same manner as the example of FIG. 10.

The following drawings are made to explain a specific example of the present specification. Since the names of specific devices or names of specific signals/messages/fields described in the drawings are provided as examples, the technical features of the present specification are not limited to the specific names used in the drawings below.

FIG. 10 shows an example of a signal flow diagram according to a third example of the disclosure of the present specification.

For reference, in the example shown in FIG. 10, data and traffic may be used interchangeably as terms having the same meaning.

1) It is assumed that the UE is joined to the multicast session to be received. The UE may be receiving data for a multicast session joined by the UE. In this embodiment, it is assumed that the NG-RAN receives data for the multicast session from the MB-UPF in a 5GC shared MBS traffic delivery method, the NG-RAN performs an operation of transmitting data for a multicast session to the UE. The 5GC shared MBS traffic delivery method may mean a multicast transmission method. For data transmission of the multicast session, a multicast session must be configured (e.g., set) and a multicast session must be created. For reference, the procedure related to configuration and/or creation of a multicast session may be performed as in the example described in the examples of FIGS. 8A and 8B above, a procedure related to configuration and/or generation of a multicast session may be performed before step 1 of FIG. 10 is performed.

2) The UE may move from 5GS to EPS. As UEs move from 5GS to EPS, (for example, as the UE moves, the UE can get out of the coverage of 5GS and receive service from the EPS), a handover procedure from 5GS to EPS (e.g., a handover procedure using an N26 interface) may be performed. For reference, the specific operation performed in step 2 may be regarded as including the operation performed up to the step prior to step 21c (V-SMF and V-UPF delete indirect data forwarding tunnel) in the prior art 5GS to EPS handover procedure using N26 interface.

For the multicast session, the same service may be provided in the MBMS scheme in EPS (or target E-UTRAN). That is, as a multicast session and an MBMS session (or a broadcast session) identified by the same TMGI are serviced in 5GS and EPS, respectively, the UE may be provided with the service through MBMS in EPS. This may mean that interworking or continuity is supported through the service layer for MBS of 5GS and MBMS of EPS.

In other words, PDU Session(s) and QoS Flow(s) moved from 5GS to EPS based on the handover procedure are not for servicing the multicast session. That is, PDU Session(s) and QoS Flow(s) moved from 5GS to EPS based on the handover procedure are not for transmitting data/traffic of the multicast session. For example, the UE may receive a service related to an MBMS session (or broadcast session) identified by the same TMGI as a multicast session service provided in 5GS through an MBMS transmission method (i.e., a broadcast transmission method) in EPS. Therefore, even if the UE moves from 5GS to EPS, a handover procedure may be performed for PDU session(s) for providing other service(s) other than the service for the multicast session, that is, for transmitting data/traffic of other service(s). One of the PDU Session(s) moved from the 5GS to the EPS may be a PDU Session used when the UE requests to join or leave the multicast session. In this case, the reason for moving the PDU session to the EPS is to provide services other than the multicast session service in the EPS.

3) The NG-RAN may recognize that the UE has moved from 5GS to EPS, or the NG-RAN may recognize that the UE should move to EPS. As the NG-RAN receives the UE Context Release Command message from the AMF during the handover process from 5GS to EPS through the N26 interface, the NG-RAN may recognize that the UE has moved from 5GS to EPS, or the NG-RAN may recognize that the UE should move to EPS.

Although not shown in the example of FIG. 10, the NG-RAN receiving the UE Context Release Command message may transmit a UE Context Release Complete message to the AMF.

If the NG-RAN knows that the UE has moved from 5GS to EPS, or if the NG-RAN knows that the UE should move to EPS, the NG-RAN may perform an operation according to one or more of steps 4 to 6 described below.

The NG-RAN may recognize that the UE moves from 5GS to EPS by receiving the UE Context Release Command message from AMF. However, this is just an example, instead of the NG-RAN recognizing that the UE moves from 5GS to EPS by receiving the UE Context Release Command message from the AMF, the NG-RAN may recognize the UE's movement to EPS or the UE leaving 5GS based on other information. For example, based on the operation related to step 1 in the handover procedure from 5GS to EPS using the N26 interface (e.g., the step of NG-RAN sending a Handover required message to AMF), or the operation related to step 11a in the handover procedure from 5GS to EPS using the N26 interface (this is the step in which the NG-RAN receives a Handover command message from the AMF), the NG-RAN may be aware of the UE's move to EPS or the UE's departure from 5GS. Or as the NG-RAN redirects (e.g., redirection can be interpreted as NG-RAN performing RRC connection release with redirection or RRC release with redirection, or, redirection can be interpreted as performing an operation of transmitting an RRCRelease message including E-UTRA carrier information redirected by NG-RAN to UE) the UE to the EPS, the NG-RAN may be aware of the UE's move to EPS or the UE's departure from 5GS.

4) The NG-RAN may remove information about the UE from context(s) (which may be MB Session Context) (e.g. multicast session related context) managed to service a multicast session.

5) Step 5 may be performed after the UE moves to EPS. If the UE moves to EPS in step 2, the UE may receive data, which was received based on a multicast session in 5GS, based on an MBMS method in EPS.

6) The NG-RAN may check whether the UE is the last UE among UEs receiving a multicast session service. If the UE was the last UE, the NG-RAN may perform an operation to no longer receive data of the multicast session from the 5G core network (e.g., the UPF or the MB-UPF). An operation to no longer receive data of the multicast session from the 5G core network (e.g., UPF or MB-UPF) may include, for example, one or more of steps 7 to 11 below.

7-8) The NG-RAN may transmit a message requesting multicast distribution release for the multicast session (e.g., a Multicast Distribution Release Request message) to the MB-SMF through AMF. The release request may be interpreted as a multicast user plane distribution release request.

9-10) The NG-RAN may receive a response message (e.g., Multicast Distribution Release Response message) to a multicast distribution release request from the MB-SMF through the AMF.

11) The NG-RAN may request the MB-UPF to stop transmitting multicast data. For example, the NG-RAN may transmit a message (e.g. Multicast Leave message (including Internet Group Management Protocol (IGMP)/Multicast Listener Discovery (MLD))) for leaving multicast transmission to the MB-UPF. For reference, the NG-RAN may additionally perform an operation of releasing radio resources for the multicast session.

If the NG-RAN recognizes that the UE moves from 5GS to EPS, the NG-RAN may additionally provide the 5G core network with information indicating that the UE no longer needs to receive multicast service. The information may include information (e.g., TMGI, MBS Session ID, etc.) identifying multicast session(s) in which the UE was serviced. The information (e.g., information that the UE no longer needs to receive multicast service) may be interpreted as information instructing the 5G core network to remove information about the UE from the context(s) managed to service the multicast session. In other words, when the 5G core network receives information that the UE no longer needs to receive multicast service, the 5G core network can remove information about the UE from the context(s) managed to service the multicast session. The information may be interpreted as information indicating that the UE has left in multicast session(s). The 5G core network may mean one or more network functions (e.g., AMF, SMF, MB-SMF, etc.). When the information (e.g., information that the UE no longer needs to receive multicast service) needs to be delivered to multiple 5G core network functions, the NG-RAN provides information (e.g., information that the UE no longer needs to receive multicast service) in one NF, the NF receiving this may transmit the information (e.g., information that the UE no longer needs to receive multicast service) to other NF(s).

The contents described in the disclosure of the present specification with reference to various examples may be applied when the 5GC Shared MBS traffic delivery method is used as a multicast session transmission method from the network to the UE. In addition, the contents described in the disclosure of the present specification with reference to various examples can be applied even when the 5GC Individual MBS traffic delivery method is used. Here, the 5GC Shared MBS traffic delivery method and the 5GC Individual MBS traffic delivery method may refer to MBS traffic delivery related procedures of the prior art.

In the contents described in the disclosure of the present specification with reference to various examples, if the UE enters/moves to EPS after receiving multicast service in 5GS, even if the UE does not explicitly perform a leave request to 5GC, it may be regarded as having performed a leave in the corresponding multicast service. That is, it can be considered that the UE has performed leave locally in the multicast service. Afterwards, if the UE enters/moves from EPS to 5GS, the UE may perform a join request to 5GC to receive multicast service.

As described in the disclosure of the present specification with reference to various examples, the AMF may recognize that the UE has moved to the EPS. In order for the AMF to provide a multicast session service to the NG-RAN serving the UE, it may be instructed to remove information about the UE from context(s) managed. If the UE is the last UE among the UEs receiving the multicast session service, the AMF may inform the MB-SMF that it no longer needs to service the multicast session, the AMF may remove information about the UE from context(s) managed to service a multicast session.

According to the disclosure of the present specification with reference to various examples, the NG-RAN may recognize that the UE has moved from 5GS to EPS or that the UE should move from 5GS to EPS. The NG-RAN may delete information about a UE that has moved to the EPS in a context related to a multicast session. If the UE that has moved to the EPS is the last UE using the multicast session, the NG-RAN may delete the multicast session itself.

According to the disclosure of the present specification with reference to various examples, if continuity of movement of 5GS multicast communication to EPS MBMS is supported through the service layer, by removing the MBS/multicast context that exists for the UE in 5GS, unnecessary resource waste and management operations due to the 5G core network and/or NG-RAN continuing to provide multicast service to the UE can be prevented. In addition, according to the description in the disclosure of the present specification with reference to various examples, if the terminal moves from 5GS to EPS, a network such as a base station (e.g., NG-RAN) can effectively perform communication by effectively removing terminal information from a context related to multicast communication. In addition, a network such as a base station (e.g., NG-RAN), when a UE that has moved to EPS is the last UE using a multicast session, by deleting the entire context related to multicast communication, communication can be performed efficiently.

For reference, the operation of the terminal (e.g., UE) described in the present specification may be implemented by the apparatus of FIGS. 1 to 3 described above. For example, the terminal (e.g., UE) may be the first device 100 or the second device 200 of FIG. 1. For example, an operation of a terminal (e.g., UE) described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 control one or more memories 104 or 204 and one or more transceivers 105 or 206, and may perform the operation of the terminal (e.g., UE) described herein by executing instructions/programs stored in one or more memories 104 or 204.

In addition, instructions for performing an operation of a terminal (e.g., UE) described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the terminal (e.g., UE) described in the disclosure of the present specification.

For reference, the operation of a network node (e.g., AMF, SMF, UPF, MB-SMF, MB-UPF, NRF, NEF, MBSF, NEF/MBSF, AF, MME, SMF+PGW-C, IPF+PGW-U, NEF/MBSF, UDR, PCF, Content Provider, BM-SC+MSF, MBMS-GW, etc.) or base station (e.g., NG-RAN, gNB, eNB, RAN, E-UTRAN, etc.) described herein may be implemented by the apparatus of FIGS. 1 to 3 to be described below. For example, a network node or a base station may be the first device 100a of FIG. 1 or the second device 100b of FIG. 1. For example, the operation of a network node or base station described herein may be processed by one or more processors 102 or 202. The operation of the terminal described herein may be stored in one or more memories 104 or 204 in the form of an instruction/program (e.g. instruction, executable code) executable by one or more processors 102 or 202. One or more processors 102 or 202 may perform the operation of a network node or a base station described herein, by controlling one or more memories 104 or 204 and one or more transceivers 106 or 206 and executing instructions/programs stored in one or more memories 104 or 204.

In addition, instructions for performing the operation of the network node or base station described in the disclosure of the present specification may be stored in a non-volatile (or non-transitory) computer-readable storage medium. The storage medium may be included in one or more memories 104 or 204. And, the instructions recorded in the storage medium are executed by one or more processors 102 or 202, so that the operations of a network node or base station are performed.

In the above, preferred embodiments have been exemplarily described, but the disclosure of the present specification is not limited to such specific embodiments, and thus, modifications, changes, or can be improved.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A method for performing communication related to multicast, the method performed by a Next Generation Radio Access Network (NG-RAN) node,
   receiving a UE context release command message related to a first User Equipment (UE) from an Access and Mobility Management Function (AMF);
   wherein the first UE is a UE using a multicast session served by the NG-RAN node;
   determining that the first UE moves from a 5th Generation System (5GS) to an Evolved Packet System (EPS); and
   based on that (i) a handover procedure from the 5GS to the EPS is used for the first UE (ii) the UE context release command message is received, removing information related to the first UE from a context related to the multicast session.

2. The method of claim 1, further comprising: determining whether the first UE is a last UE among one or more UEs using the multicast session.

3. The method of claim 1, further comprising:
   deleting all contexts related to the multicast session based on that the first UE is the last UE among the one or more UEs using the multicast session.

4. The method of claim 2, further comprising:
   based on that the first UE is the last UE, transmitting a multicast distribution release request message to the AMF.

5. The method of claim 4, further comprising:
   receiving a multicast distribution release response message from the AMF in response to the multicast distribution release request message.

6. The method of claim 2 further comprising:
   transmitting a multicast leave message to a Multicast Broadcast User Plane Function (MB-UPF) that manages the multicast session to request to stop transmission of data related to the multicast session.

7. The method of claim 1,
   wherein the UE context release command message is received based on a handover procedure from the 5GS to the EPS for the first UE being performed.

8. The method of claim 1,
   wherein the removing further comprising:
   removing information related to the first UE from a context related to the multicast session, based on that the first UE has one or more unicast Protocol Data Unit (PDU) sessions moving from the 5GS to the EPS, a handover procedure for the first UE from the 5GS to the EPS is performed, and the UE context based on the release command message being received.

9. A Next Generation Radio Access Network (NG-RAN) node for performing communication related to multicast, the NG-RAN node comprising:
   at least one processor; and
   at least one memory that stores instructions and is operably electrically connectable with the at least one processor;
   wherein the operations performed based on the instructions being executed by the at least one processor include:
   receiving a UE context release command message related to a first User Equipment (UE) from an Access and Mobility Management Function (AMF);
   wherein the first UE is a UE using a multicast session served by the NG-RAN node;
   determining that the first UE moves from a 5th Generation System (5GS) to an Evolved Packet System (EPS); and
   based on that (i) a handover procedure from the 5GS to the EPS is used for the first UE (ii) the UE context release command message is received, removing information related to the first UE from a context related to the multicast session.

10. A method for performing communication related to multicast, the method performed by an Access and Mobility Management Function (AMF),
    transmitting a UE context release command message related to a first User Equipment (UE) to a Next Generation Radio Access Network (NG-RAN) node serving the first UE, based on that a first User Equipment (UE) moves from a 5th Generation System (5GS) to an Evolved Packet System (EPS),
    wherein the first UE is a UE using a multicast session served by the NG-RAN node; and
    receiving a multicast distribution release request message from the NG-RAN node,
    wherein the UE context release command message is used by the NG-RAN node to remove information related to the first UE from a context related to the multicast session.

11. The method of claim 10, further comprising:
    transmitting the multicast distribution release request message to a Multicast Broadcast Session Management Function (MB-SMF) managing the multicast session, based on the multicast distribution release request message being received.

12. The method of claim 11, further comprising:
    receiving a multicast distribution release response message from the MB-SMF in response to the multicast distribution release request; and
    transmitting the multicast distribution release response message to the NG-RAN node.

* * * * *